(12) United States Patent
Duan et al.

(10) Patent No.: US 11,155,292 B2
(45) Date of Patent: Oct. 26, 2021

(54) SAFETY LOCK AND STROLLER THEREWITH

(71) Applicant: Wonderland Switzerland AG, Steinhausen (CH)

(72) Inventors: Xiaosong Duan, Guangdong (CN); Jialiang Yuan, Guangdong (CN); Wei-Huan Liu, Guangdong (CN)

(73) Assignee: Wonderland Switzerland AG, Steinhausen (CH)

( * ) Notice: Subject to any disclaimer, the term of this patent is extended or adjusted under 35 U.S.C. 154(b) by 210 days.

(21) Appl. No.: 16/584,960

(22) Filed: Sep. 27, 2019

(65) Prior Publication Data

US 2020/0101996 A1 Apr. 2, 2020

(30) Foreign Application Priority Data

Sep. 29, 2018 (CN) .......................... 201811150424.0

(51) Int. Cl.
*B62B 7/06* (2006.01)

(52) U.S. Cl.
CPC .................................. *B62B 7/064* (2013.01)

(58) Field of Classification Search
CPC .............. B62B 7/064; B62B 7/06; B62B 7/08
See application file for complete search history.

(56) References Cited

U.S. PATENT DOCUMENTS

| 8,226,110 | B2 * | 7/2012 | Liao | B62B 7/064 |
| | | | | 280/642 |
| 9,216,755 | B2 * | 12/2015 | Eisinger | B62B 7/068 |
| 9,561,816 | B2 * | 2/2017 | Dowd | B62B 7/062 |
| 9,981,678 | B1 | 5/2018 | Chen | |
| 2006/0131840 | A1 * | 6/2006 | Donay | B62B 7/123 |
| | | | | 280/642 |

FOREIGN PATENT DOCUMENTS

| CN | 202541614 U | 11/2012 |
| CN | 202574334 U | 12/2012 |
| GB | 2476392 A | 6/2011 |
| GB | 2497765 A | 6/2013 |

* cited by examiner

*Primary Examiner* — John D Walters
(74) *Attorney, Agent, or Firm* — Winston Hsu

(57) ABSTRACT

A safety lock includes a releasing component and a locking component. The locking component is movably disposed on a frame releasing component or a stroller frame. The locking component is driven by the releasing component to move relative to the frame releasing component or the stroller frame between a blocking position and a releasing position. The locking component engages with the frame releasing component to restrain the frame releasing component from unlocking the stroller frame or engages with the stroller frame to restrain the stroller frame from being folded when the locking component is located at the blocking position, and the locking component disengages from the frame releasing component to allow the frame releasing component to unlock the stroller frame or disengages from the stroller frame to allow the stroller frame to be folded when the locking component is located at the releasing position.

20 Claims, 31 Drawing Sheets

SAFETY LOCK AND STROLLER THEREWITH

BACKGROUND OF THE INVENTION

1. Field of the Invention

The present invention relates to a child product, and more particularly, to a safety lock and a stroller therewith.

2. Description of the Prior Art

With development of economy and advancement of technology, there are more and more consumer products which facilitate people's daily lives.

It is known that strollers are one of the most popular consumer products which are specifically designed for children. A user or a caregiver can carry a child with a stroller instead of holding the child by hands, which reduces burden of the user's hands or the caregiver's hands and allows the user or the caregiver to take care of the child easily.

Currently, in order for easy transportation or easy storage, the stroller is usually configured to be foldable. The stroller can be folded when being not in use for saving occupied space and be unfolded when being in use, which provides flexibility.

The conventional stroller usually includes a stroller frame, a locking device and folding handle. The locking device is for locking the stroller frame for restraining the stroller frame from being folded. The folding handle is for driving the locking device to unlock the stroller frame. Therefore, when it is desired to fold the stroller, the folding handle can be operated to drive the locking device to unlock the stroller frame for allowing the stroller frame to be folded. However, the stroller may be folded when the folding handle is operated by a child or a caregiver unintentionally, which causes a potential hazard.

Therefore, there is a need for providing a safety lock for preventing an accident folding of a stroller frame and a stroller therewith for solving the aforementioned problem.

SUMMARY OF THE INVENTION

It is an objective of the present invention to provide a safety lock for preventing an accident folding of a stroller frame and a stroller therewith.

In order to achieve the aforementioned objective, the present invention discloses a safety lock adapted for a stroller. The stroller includes a stroller frame, a locking device and at least one frame releasing component. The stroller frame is switchable between a folded state and an unfolded state. The locking device is for locking the stroller frame to restrain the stroller frame from being folded or for unlocking the stroller frame to allow the stroller frame to be folded. The at least one frame releasing component is for driving the locking device to unlock the stroller frame. The safety lock includes at least one releasing component and at least one locking component. The at least one locking component is movably disposed on the at least one frame releasing component or the stroller frame. The at least one locking component is driven by the at least one releasing component to move relative to the at least one frame releasing component or the stroller frame between a blocking position and a releasing position. The at least one locking component engages with the at least one frame releasing component to restrain the at least one frame releasing component from unlocking the stroller frame by the locking device or engages with the stroller frame to restrain the stroller frame from being folded when the at least one locking component is located at the blocking position, and the at least one locking component disengages from the at least one frame releasing component to allow the at least one frame releasing component to unlock the stroller frame by the locking device or disengages from the stroller frame to allow the stroller frame to be folded when the at least one locking component is located at the releasing position.

Preferably, according to an embodiment of the present invention, the safety lock further includes at least one first resilient component disposed between the at least one locking component and one of the stroller frame and the at least one frame releasing component where the at least one locking component is disposed. A first end of the at least one first resilient component is connected to or abuts against the at least one locking component. A second end of the at least one first resilient component is connected to or abuts against the one of the stroller frame and the at least one frame releasing component where the at least one locking component is disposed, and the at least one first resilient component is for biasing the at least one locking component to move to the blocking position.

Preferably, according to an embodiment of the present invention, the at least one releasing component includes a driving profile. The at least one locking component abuts against the driving profile, and the at least one locking component is driven by the driving profile and the at least one first resilient component to switch between the releasing position and the blocking position when the at least one releasing component moves.

Preferably, according to an embodiment of the present invention, the driving profile is formed on an outer periphery or an inner periphery of the at least one releasing component.

Preferably, according to an embodiment of the present invention, the driving profile includes a driving inclined surface or a driving groove.

Preferably, according to an embodiment of the present invention, the at least one releasing component is pivotally disposed on the stroller frame or the frame releasing component around a first pivoting axis, and a moving direction of the at least one locking component is substantially parallel to the first pivoting axis of the at least one releasing component.

Preferably, according to an embodiment of the present invention, the at least one frame releasing component is pivotally disposed on the stroller frame. The at least one frame releasing component and the at least one releasing component are arranged along the first pivoting axis of the at least one releasing component. The first pivoting axis of the at least one releasing component is substantially collinear or parallel to a pivoting axis the at least one frame releasing component.

Preferably, according to an embodiment of the present invention, the at least one releasing component includes a stopping protrusion for restraining a range of a pivoting movement of the at least one releasing component around the first pivoting axis.

Preferably, according to an embodiment of the present invention, the safety lock further includes an operating component movably linked to the at least one releasing component for driving the at least one locking component to move to the releasing position by the at least one releasing component.

Preferably, according to an embodiment of the present invention, the safety lock includes two releasing components and two locking components. The two releasing components are located at two lateral sides of the stroller frame. The two locking components are located at the two lateral sides of the stroller frame, and two ends of the operating component are connected to the two releasing components located at the two lateral sides of the stroller frame.

Preferably, according to an embodiment of the present invention, the safety lock further includes a second resilient component connected to or abutting against the operating component for biasing the operating component to recover.

Preferably, according to an embodiment of the present invention, the safety lock further includes at least one linking component disposed between the operating component and the at least one releasing component, and the operating component drives the at least one releasing component by the at least one linking component to drive the at least one locking component to move to the releasing position.

Preferably, according to an embodiment of the present invention, the at least one locking component is substantially a step-shaft structure.

Preferably, according to an embodiment of the present invention, the safety lock further includes at least one linking component disposed between the at least one releasing component and the at least one locking component, and the at least one releasing component driving the at least one locking component to move to the releasing position by the at least one linking component.

Preferably, according to an embodiment of the present invention, the at least one locking component is pivotally connected to the stroller frame or the at least one frame releasing component, and a pivoting axis of the at least one locking component is substantially collinear or parallel to a pivoting axis of the at least one frame releasing component.

Preferably, according to an embodiment of the present invention, the at least one locking component includes a first abutting segment and a second abutting segment divided by the pivoting axis of the at least one locking component. The first abutting segment is for abutting against the stroller frame, and the second abutting segment is for abutting against the at least one frame releasing component.

Preferably, according to an embodiment of the present invention, an included angle between the first abutting segment and the second abutting segment is less than 90 degrees Preferably, according to an embodiment of the present invention, a moving direction of the at least one locking component is not parallel to a pivoting axis of the at least one frame releasing component.

Preferably, the safety lock further includes at least one third resilient component disposed between the at least one releasing component and one of the stroller frame and the at least one frame releasing component where the at least one releasing component is disposed. A first end of the at least one third resilient component is connected to or abutting against the at least one releasing component. A second end of the at least one third resilient component is connected to or abutting against the one of the stroller frame and the at least one frame releasing component where the at least one releasing component is disposed, and the at least one third resilient component is for biasing the at least one releasing component to recover.

In order to achieve the aforementioned objective, the present invention further includes a stroller. The stroller includes a stroller frame, a locking device, at least one frame releasing component and a safety lock. The stroller frame is switchable between a folded state and an unfolded state. The locking device is for locking the stroller frame to restrain the stroller frame from being folded or for unlocking the stroller frame to allow the stroller frame to be folded. The at least one frame releasing component is for driving the locking device to unlock the stroller frame. The safety lock includes at least one releasing component and at least one locking component. The at least one locking component is movably disposed on the at least one frame releasing component or the stroller frame. The at least one locking component is driven by the at least one releasing component to move relative to the at least one frame releasing component or the stroller frame between a blocking position and a releasing position. The at least one locking component engages with the at least one frame releasing component to restrain the at least one frame releasing component from unlocking the stroller frame by the locking device or engages with the stroller frame to prevent the stroller frame from being folded when the at least one locking component is located at the blocking position, and the at least one locking component disengages from the at least one frame releasing component to allow the at least one frame releasing component to unlock the stroller frame by the locking device or disengages from the stroller frame to allow the stroller frame to be folded when the at least one locking component is located at the releasing position.

In summary, the safety lock of the present invention utilizes the releasing component to drive the locking component to move between the releasing position and the blocking position. When the locking component is located at the blocking position, the locking component engages with the frame releasing component or the stroller frame to restrain the stroller frame from being folded. When the locking component is located at the releasing position, the locking component disengages from the frame releasing component or the stroller frame to allow the stroller frame to be folded. Therefore, before folding the stroller, it has to operate the releasing component to move the locking component to the releasing component, which can effectively prevent an unintentional folding of the stroller frame caused by unintentional operation of the frame releasing component. Therefore, it improves safety of the stroller. Furthermore, the safety lock of the present invention has advantages of simple structure and easy operation.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
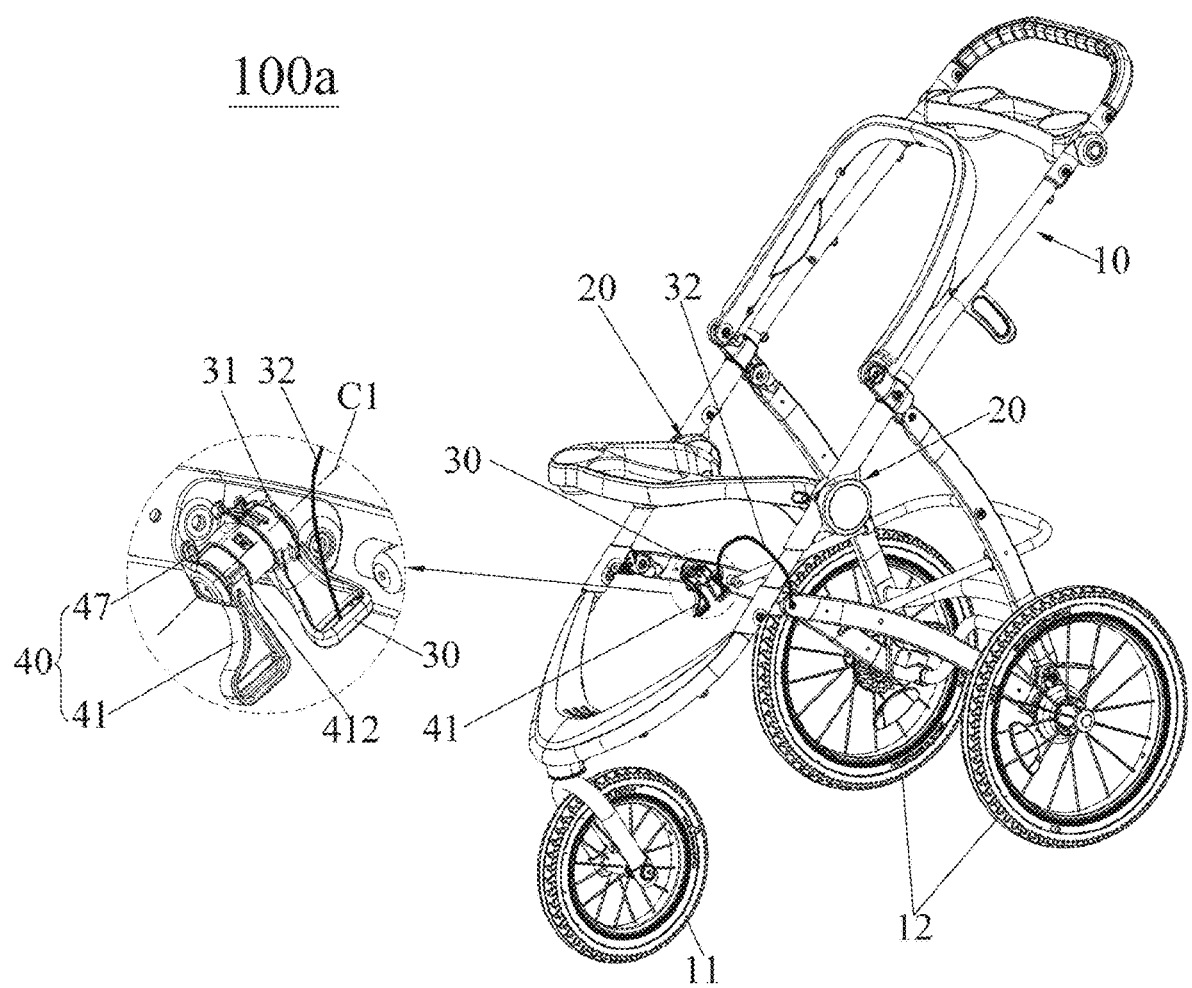
FIG. 1 is a schematic diagram of a stroller according to a first embodiment of the present invention.
Figure 2:
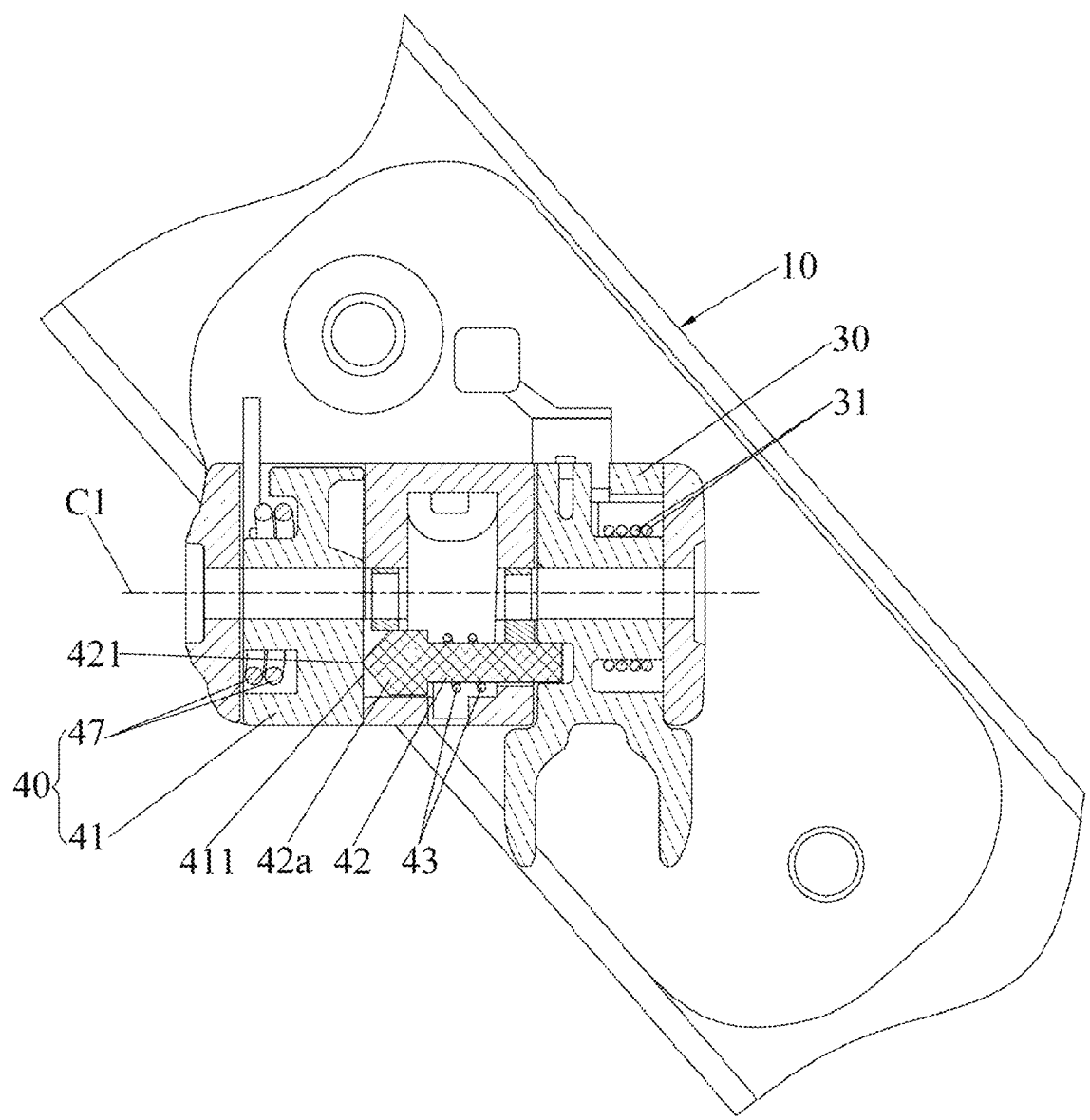
FIG. 2 is a partial internal structural diagram of the stroller as a safety lock is in a blocking state according to the first embodiment of the present invention.
Figure 3:
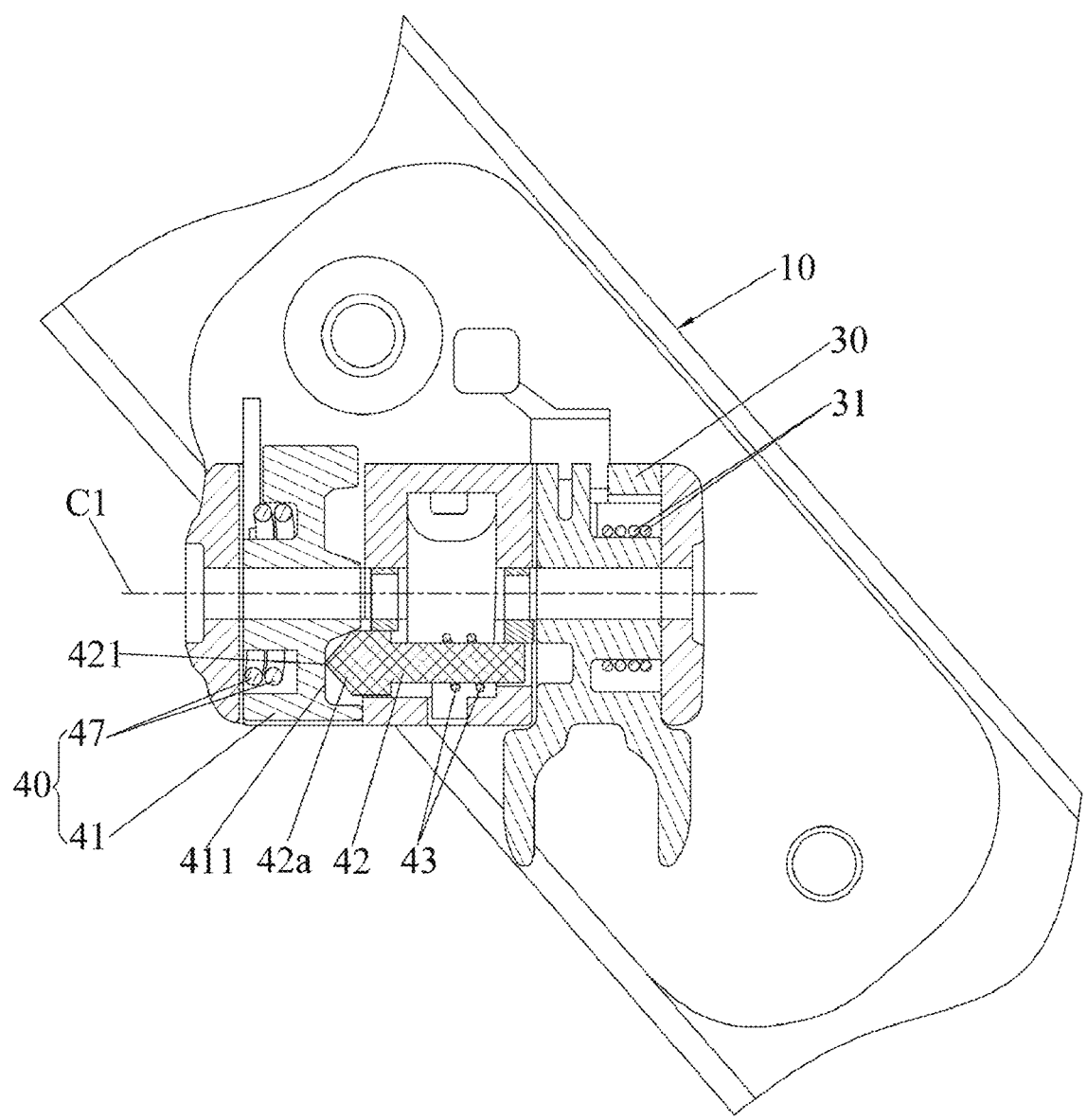
FIG. 3 is a partial internal structural diagram of the stroller as the safety lock is in a releasing state according to the first embodiment of the present invention.
Figure 4:
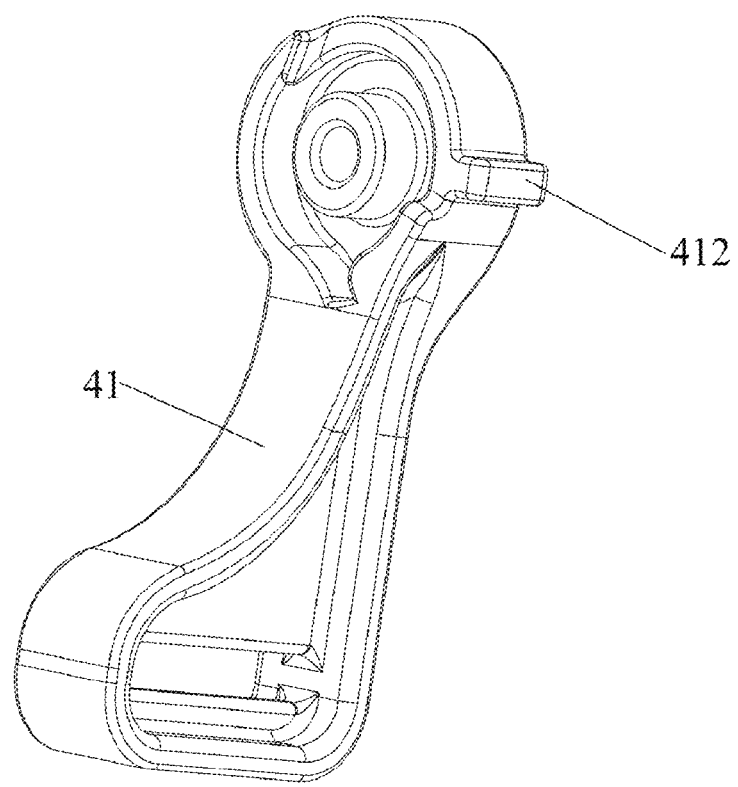
FIG. 4 is a diagram of a releasing component of the safety lock according to the first embodiment of the present invention.

Please refer to FIG. 1 to FIG. 4. FIG. 1 is a schematic diagram of a stroller 100a according to a first embodiment of the present invention. FIG. 2 is a partial internal structural diagram of the stroller 100a as a safety lock 40 is in a blocking state according to the first embodiment of the present invention. FIG. 3 is a partial internal structural diagram of the stroller as the safety lock 40 is in a releasing state according to the first embodiment of the present invention. FIG. 4 is a diagram of a releasing component 41 of the safety lock 40 according to the first embodiment of the present invention. As shown in FIG. 1 to FIG. 4, the stroller 100a includes a stroller frame 10, two locking devices 20, two frame releasing components 30 and the safety lock 40. The stroller frame 10 is switchable between a folded state and an unfolded state. The two locking devices 20 are for locking the stroller frame 10 to restrain the stroller frame 10 from being folded or for unlocking the stroller frame 10 to allow the stroller frame 10 to be folded. The two frame releasing components 30 are for driving the two locking devices 20 to unlock the stroller frame 10. Specifically, in this embodiment, the two locking devices 20 can be located at two lateral sides of the stroller frame 10 for providing a reliable locking effect when the stroller frame 10 is unfolded. Furthermore, the two frame releasing components 20 can be located at the two lateral sides of the stroller frame 10 for driving the two locking devices 20 at the two lateral sides of the stroller frame 10. However, it is not limited to this embodiment. For example, in another embodiment, the stroller can include only one locking device and one frame releasing component which are disposed on one lateral side of the stroller frame or any other position of the stroller frame.

Besides, in this embodiment, the stroller 100a of this embodiment includes one front wheel 11 installed on a front side of a bottom portion of the stroller frame 10 and two rear wheels 12 installed on a rear side of the bottom portion of the stroller frame 10. In other words, the stroller 100a of this embodiment can be a three-wheel stroller. However, it is not limited thereto. For example, in another embodiment, the stroller also can be a four-wheel stroller, i.e., the stroller can include two front wheels and two rear wheel.

In addition, in this embodiment, in order for easy operation of the two frame releasing components 30 at the two lateral sides of the stroller frame 10, the stroller 100a further includes a pulling component 32 which is made of soft material and connected to the two frame releasing components 30 at the two lateral sides of the stroller frame 10. Preferably, the pulling component 32 can be a woven strap. However, it is not limited thereto. For example, in another embodiment, the pulling component also can be a flexible cable, a metal wire, or nylon cable.

Moreover, in this embodiment, in order to facilitate the two frame releasing components 30 to recover, the stroller 100a includes two releasing recovering components 31, and each releasing recovering component 31 is disposed between the corresponding frame releasing component 30 and the stroller frame 10. However, it is not limited to this embodiment. For example, in another embodiment, the releasing recovering component can be omitted, and the two frame releasing components are recovered by a user manually.

As shown in FIG. 1 to FIG. 4, the safety lock 40 is disposed on a right one of the two lateral sides of the stroller frame 10 for allowing a corresponding right one of the two frame releasing components 30 to drive a corresponding right one of the two locking devices 20 to unlock the stroller frame 10 or restrain the corresponding right one of the two frame releasing components 20 from driving the corresponding right one of the two locking devices 20. However, it is not limited to this embodiment. For example, in another embodiment, the safety lock can be configured to allow a corresponding left one of the two frame releasing components to drive a corresponding left one of the two locking devices to unlock the stroller frame or restrain the corresponding left one of the two frame releasing components from driving the corresponding left one of the two locking devices. Alternatively, in another embodiment, the safety lock can be configured to allow the two frame releasing components to drive the two locking devices to unlock the stroller frame or restrain the two frame releasing components from driving the two locking devices.

The safety lock 40 includes a releasing component 41, a locking component 42, a first resilient component 43 and a third resilient component 47. The locking component 42 is movably disposed on the stroller frame 10. However, it is not limited to this embodiment. The locking component can be movably disposed on the stroller frame or the frame releasing component in another way. For example, in another embodiment, the locking component can be pivotally disposed on the stroller frame or movably disposed on the frame releasing component. The locking component 42 is movable relative to the frame releasing component 30 between a blocking position as shown in FIG. 2, and a releasing position as shown in FIG. 3. When the locking component 42 is located at the blocking position, the frame releasing component 30 is allowed to drive the locking device 20 to unlock the stroller frame 10. When the locking component 42 is located at the releasing position, the frame releasing component 30 is restrained from driving the locking device 20 to unlock the stroller frame 10.

The releasing component 41 is pivotally disposed on the stroller frame 10 around a first pivoting axis C1. However, it is not limited to this embodiment. The releasing component can be movably disposed on the frame releasing component or the stroller frame in another way. For example, in another embodiment, the releasing component can be pivotally disposed on the frame releasing component around the first pivoting axis or movably disposed on the frame releasing component or the stroller frame. The first resilient component 43 can preferably be a compression spring and disposed between the stroller frame 10 and the locking component 42. A first end of the first resilient component 43 abuts against the locking component 42, and a second end of the first resilient component 43 abuts against the stroller frame 10, so that the locking component 42 is biased to move to the releasing position by the first resilient component 43. However, it is not limited to this embodiment. For example, in another embodiment, the first resilient component can be a tension spring, and the first end and the second end of the first resilient component can be connected to the locking component and the stroller frame respectively. Alternatively, in another embodiment, the first resilient component can be for biasing the locking component to move to the blocking position.

The third resilient component 47 can preferably be a torsional spring and disposed between the releasing component 41 and the stroller frame 10. A first end of the third resilient component 47 abuts against the releasing component 41, and a second end of the third resilient component 47 abuts against the stroller frame 10, so that the releasing component 41 is biased to recover by the third resilient component 47. However, it is not limited to this embodiment. For example, in another embodiment, the third resilient component can be a tension spring, and the first end and the second end of the third resilient component can be connected to the releasing component and the stroller frame respectively. Alternatively, in another embodiment, the third resilient component can be omitted, and the releasing component can be recovered by the user manually.

As shown in FIG. 2 and FIG. 3, a moving direction of the locking component 42 is substantially parallel to the first pivoting axis C1 of the releasing component 41, so that the releasing component 41 can drive the locking component 42 to switch between the blocking position and the releasing position along the first pivoting axis C1 of the releasing component 41 when the releasing component pivots around the first pivoting axis C1 for ensuring a reliable and smooth movement of the locking component 42. Specifically, the releasing component 41 includes a driving profile 411. The driving profile 411 includes a driving groove with an inclined surface. The locking component 42 includes an abutting profile 421 for cooperating with the driving profile 411. The locking component 42 is driven by the first resilient component 43 and cooperation of the driving profile 411 of the releasing component 41 and the abutting profile 421 of the locking component 42 to switch between the blocking position and the releasing position along the first pivoting axis C1 when the releasing component 42 moves.

Furthermore, in this embodiment, the locking component 42 includes a conical head 42a. The abutting profile 421 is formed on the conical head 42a. Such configuration reduces a contacting area of the driving profile 411 and the abutting profile 421, which facilitates the cooperation of the driving profile 411 and the abutting profile 421 for achieving a purpose of switching the locking component 42 between the releasing position and the blocking position. However, it is not limited to this embodiment.

As shown in FIG. 1 to FIG. 3, the frame releasing component 30 is pivotally disposed on the stroller frame 10. The frame releasing component 30 and the releasing component 41 are arranged along the first pivoting axis C1 of the releasing component 41, and the first pivoting axis C1 of the releasing component 41 is substantially collinear to a pivoting axis of the frame releasing component 30, so that the releasing component 41 and the frame releasing component 30 can be coaxially disposed on the stroller frame 10 for achieving a purpose of driving the locking component 42 by the releasing component 41 in a close distance. However, it is not limited to this embodiment. For example, in another embodiment, the pivoting axis of the frame releasing component can be substantially parallel to but not collinear to the first pivoting axis of the releasing component.

Besides, as shown in FIG. 1 and FIG. 4, the releasing component 41 includes a stopping protrusion 412 for restraining a range of a pivoting movement of the releasing component 41 around the first pivoting axis C1, so as to ensure the reliable pivoting movement of the releasing component 41. Furthermore, in this embodiment, the releasing component 41 and the frame releasing component 30 can be handle structure, and the locking component 42 can be a pin structure. However, it is not limited to this embodiment.

As shown in FIG. 1 to FIG. 4, detailed description of operation of the stroller 100a is provided as follows. When it is desired to fold the stroller 100a, the releasing component 41 can be operated to pivot around the first pivoting axis C1. The locking component 42 can be driven by the releasing component 41 and the first resilient component 43 to move from the blocking position as shown in FIG. 2, to the releasing position as shown in FIG. 3, when the releasing component 41 pivots. When the locking component 42 is located at the releasing position, the locking component 42 disengages from the frame releasing component 30, so as to allow the frame releasing component 30 to drive the locking device 20 to unlock the stroller frame 10. In other words, after the releasing component 41 is operated to move the locking component 42 to the releasing position, the stroller frame 10 is allowed to be folded.

Figure 5:
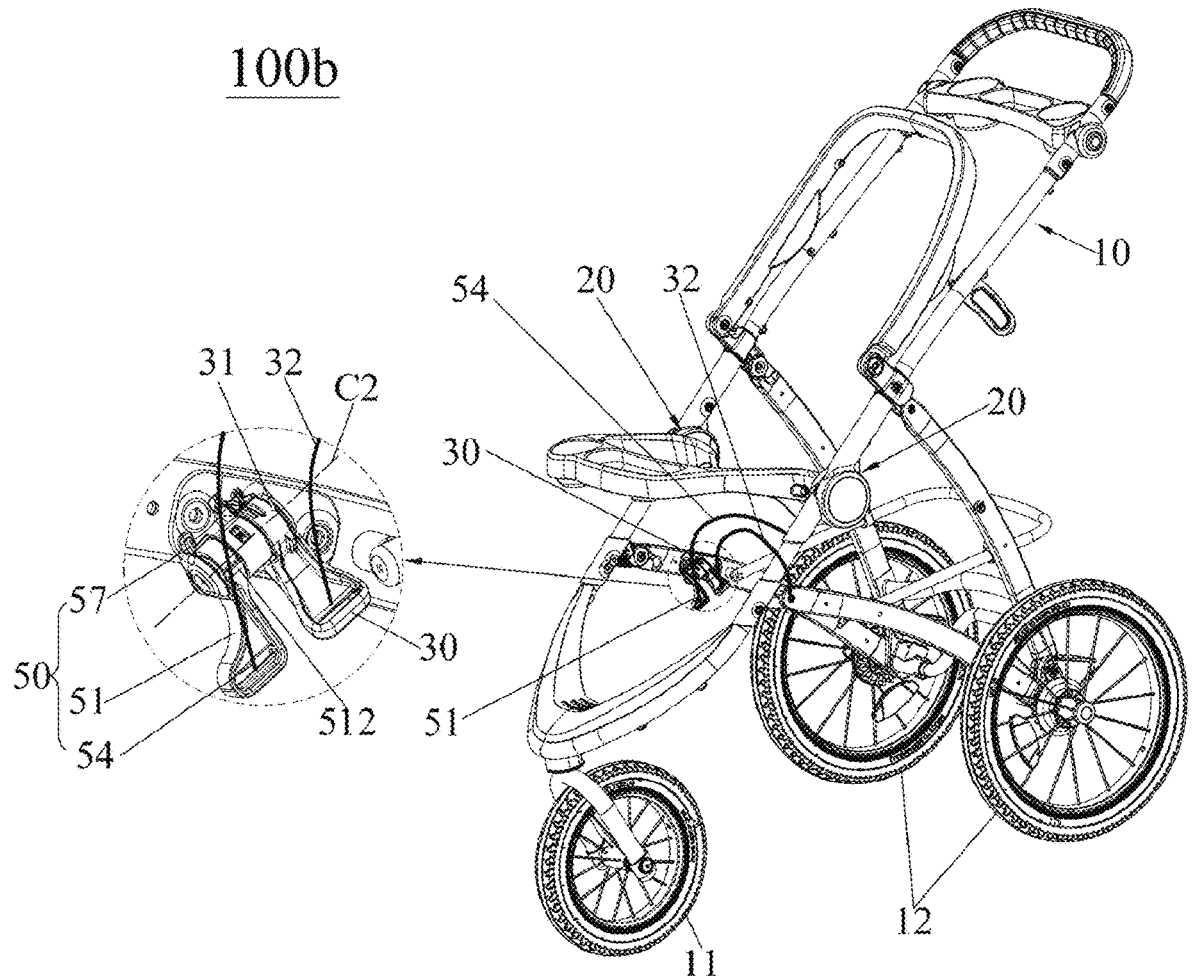
FIG. 5 is a schematic diagram of a stroller according to a second embodiment of the present invention.
Figure 6:
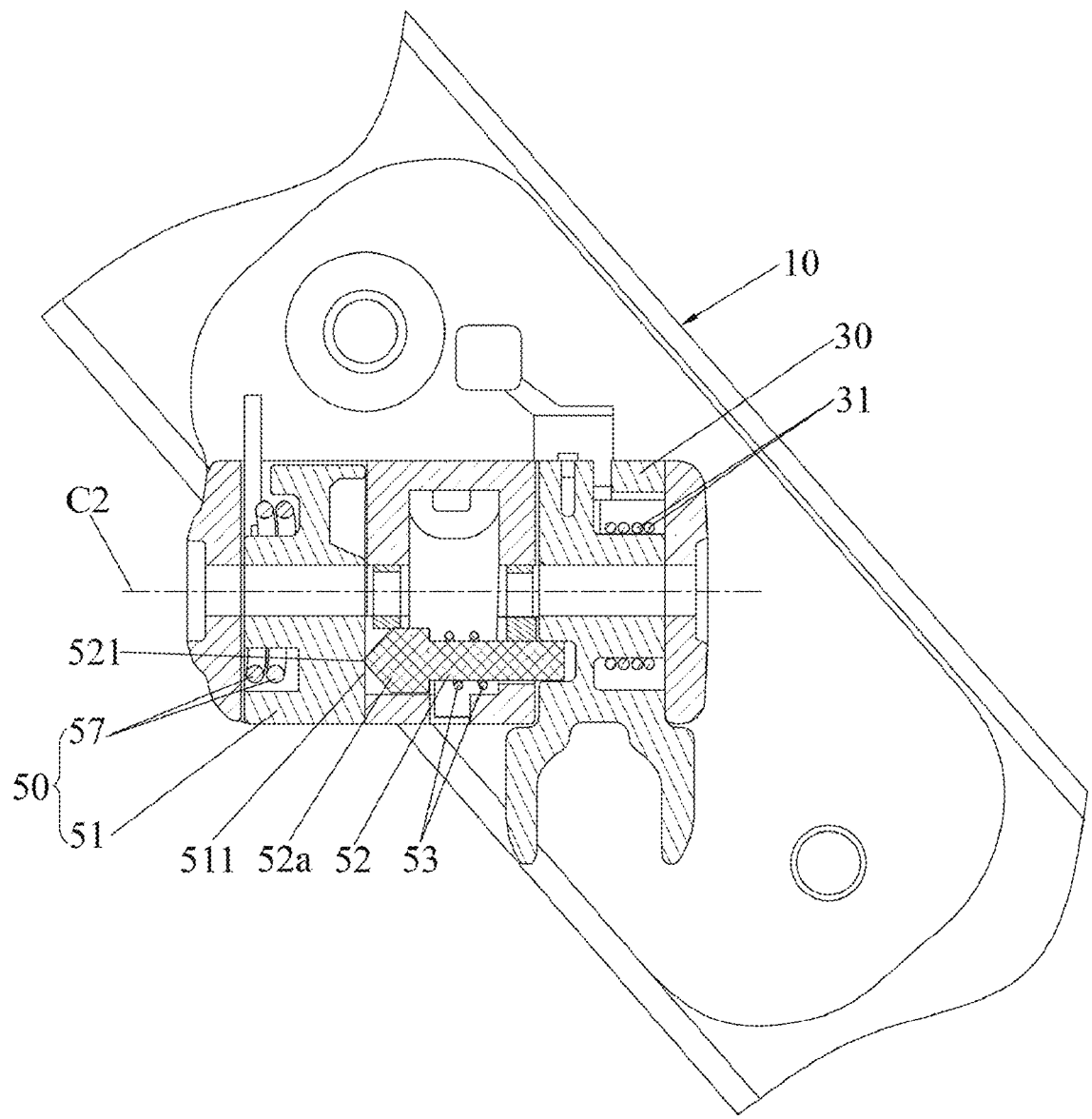
FIG. 6 is a partial internal structural diagram of the stroller as a safety lock is in a blocking state according to the second embodiment of the present invention.
Figure 7:
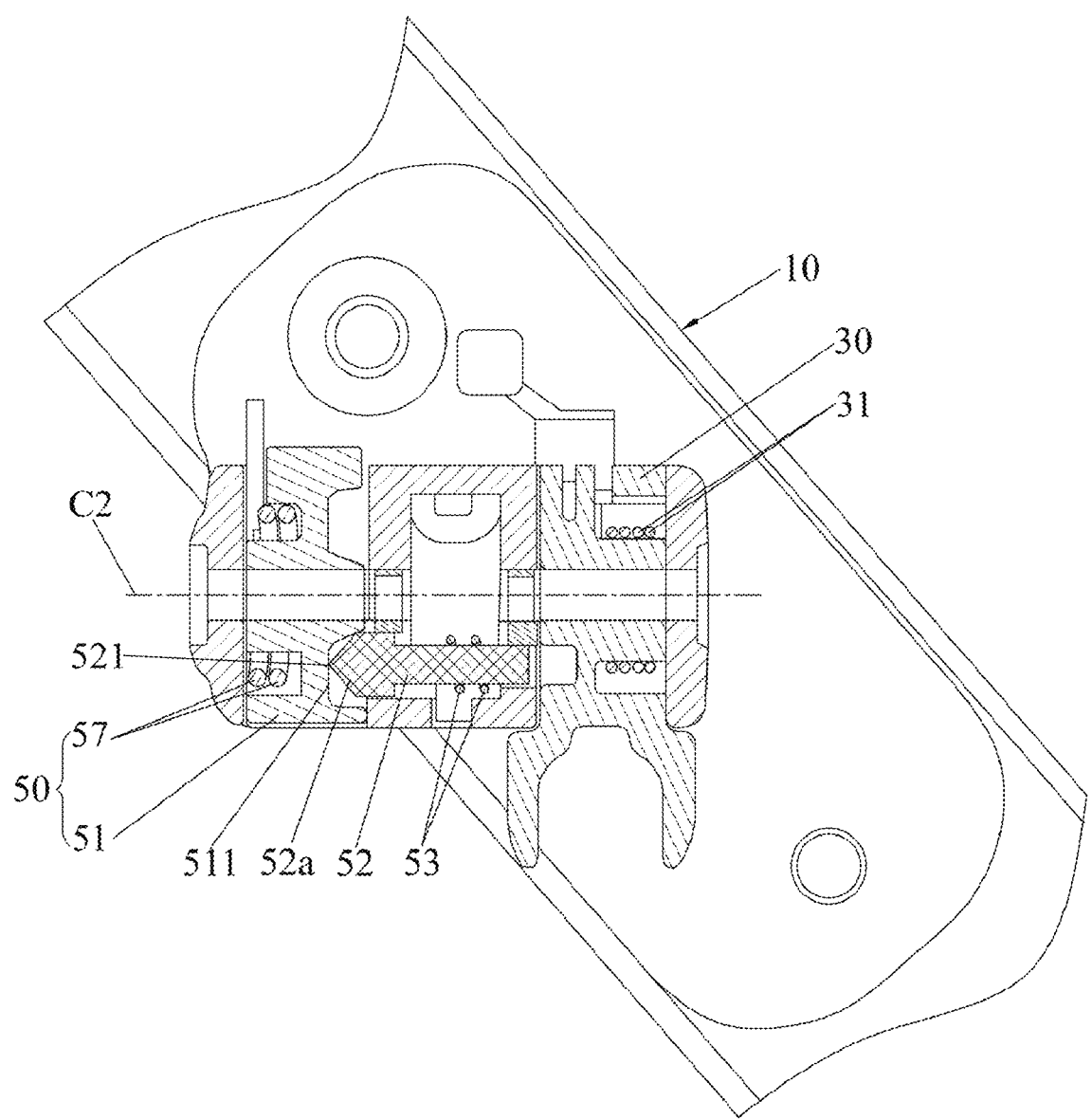
FIG. 7 is a partial internal structural diagram of the stroller as the safety lock is in a releasing state according to the second embodiment of the present invention.
Figure 8:
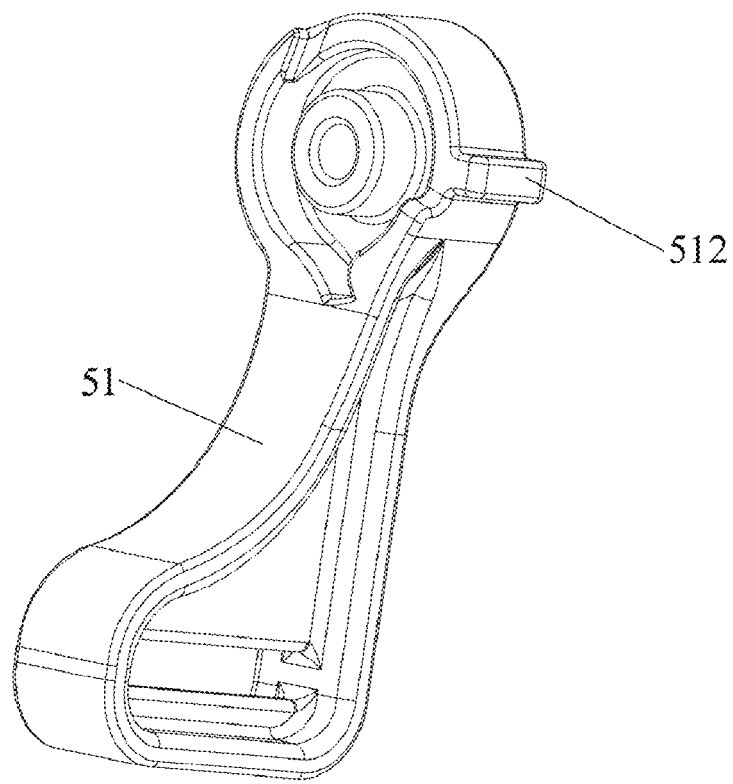
FIG. 8 is a diagram of a releasing component of the safety lock according to the first embodiment of the present invention.

Please refer to FIG. 5 to FIG. 8. FIG. 5 is a schematic diagram of a stroller 100b according to a second embodiment of the present invention. FIG. 6 is a partial internal structural diagram of the stroller 100b as a safety lock 50 is in a blocking state according to the second embodiment of the present invention. FIG. 7 is a partial internal structural diagram of the stroller 100b as the safety lock 50 is in a releasing state according to the second embodiment of the present invention. FIG. 8 is a diagram of a releasing component 51 of the safety lock 50 according to the first embodiment of the present invention. As shown in FIG. 5 to FIG. 8, the stroller frame 10, the locking device 20 and the frame releasing component 30 of this embodiment are similar to the ones of the first embodiment. Detailed description for those similar parts is omitted herein for simplicity. Furthermore, the safety lock 50 of this embodiment includes two releasing components 51, two locking components 52, two first resilient components 53, an operating component 54 and two third resilient components 57. The two releasing components 51, the two locking components 52, the two first resilient component 53, and two third resilient components 57 are disposed on the two lateral sides of the stroller frame 10 symmetrically. The operating component 54 is movably linked to the two releasing components 54 for driving the two locking components 52 to move to the releasing positions by the two releasing components 51. The structure and the configuration of the releasing component 51, the locking component 52, the first resilient component 53 and the third resilient component 57 at one lateral side of the stroller frame 10 are similar to the ones of the releasing component 41, the locking component 42, the first resilient component 43 and the third resilient component 47 of the first embodiment. Detailed description is omitted herein.

Detailed description of operation of the stroller 100b is provided as follows. When it is desired to fold the stroller 100b, the operating component 54 can be operated to drive the two releasing components 51 to pivot around first pivoting axes C2. The two locking components 52 can be driven by the two releasing components 51 and the two first resilient components 53 to move from the blocking positions as shown in FIG. 6, to the releasing positions as shown in FIG. 7, when the two releasing components 51 pivots. When the two locking components 52 is located at the releasing position, the two locking components 52 disengage from the two frame releasing components 30, so as to allow the two frame releasing components 30 to drive the two locking devices 20 to unlock the stroller frame 10. In other words, after the operating component 54 is operated to drive the two releasing components 51 to move the two locking components 52 to the releasing positions, the stroller frame 10 is allowed to be folded.

Figure 9:
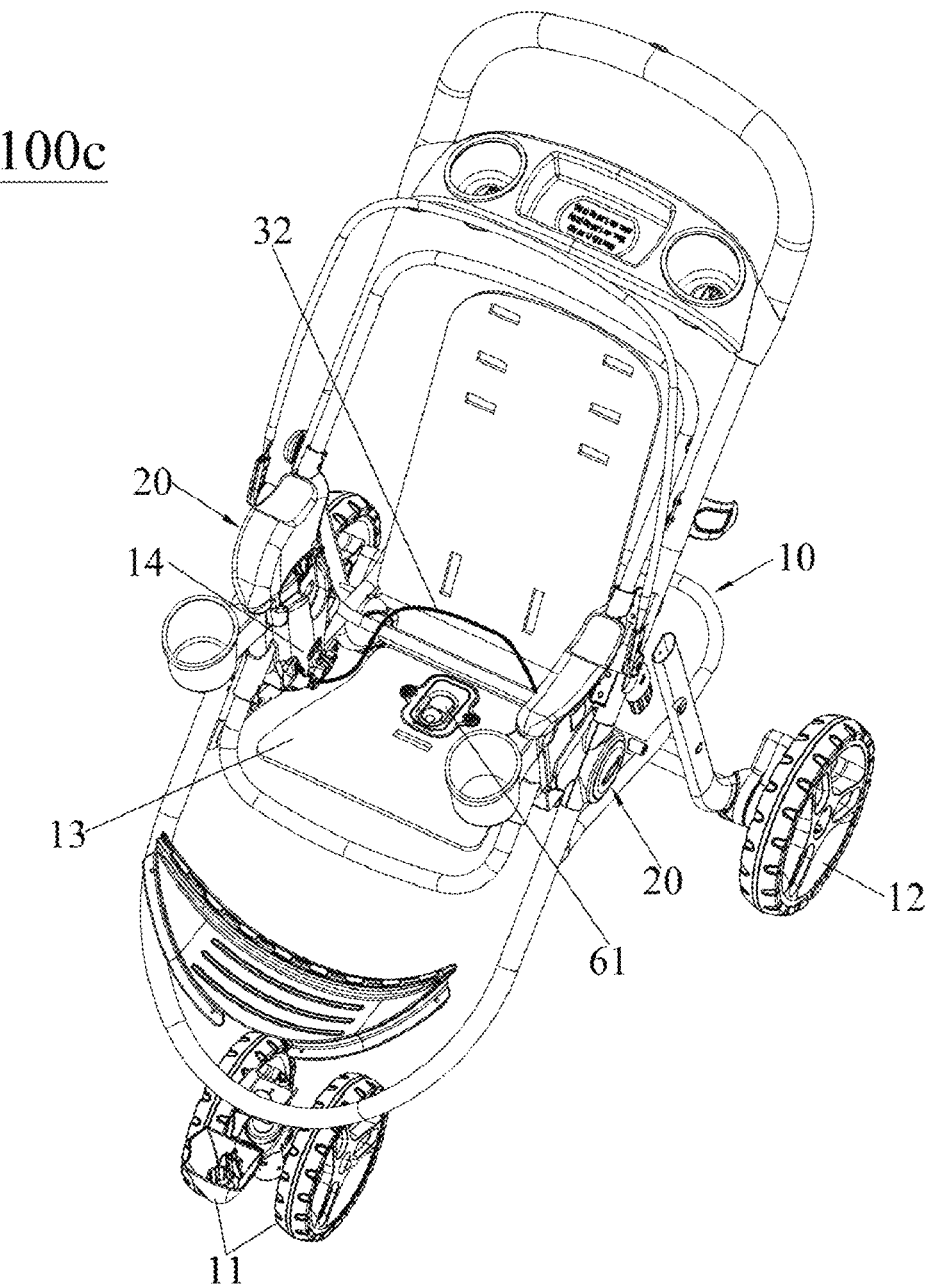
FIG. 9 is a schematic diagram of a stroller according to a third embodiment of the present invention.
Figure 10:
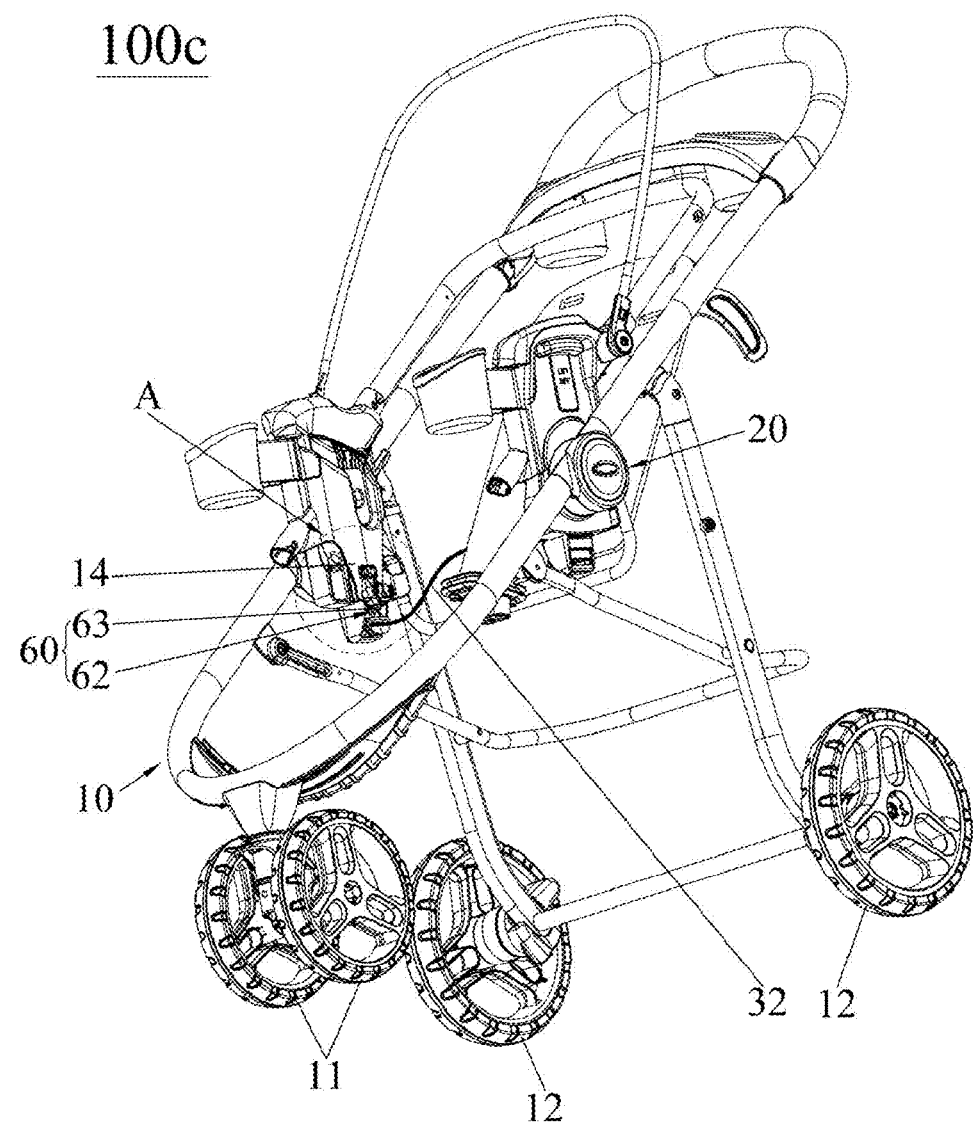
FIG. 10 is a partial diagram of the stroller according to the third embodiment of the present invention.
Figure 11:
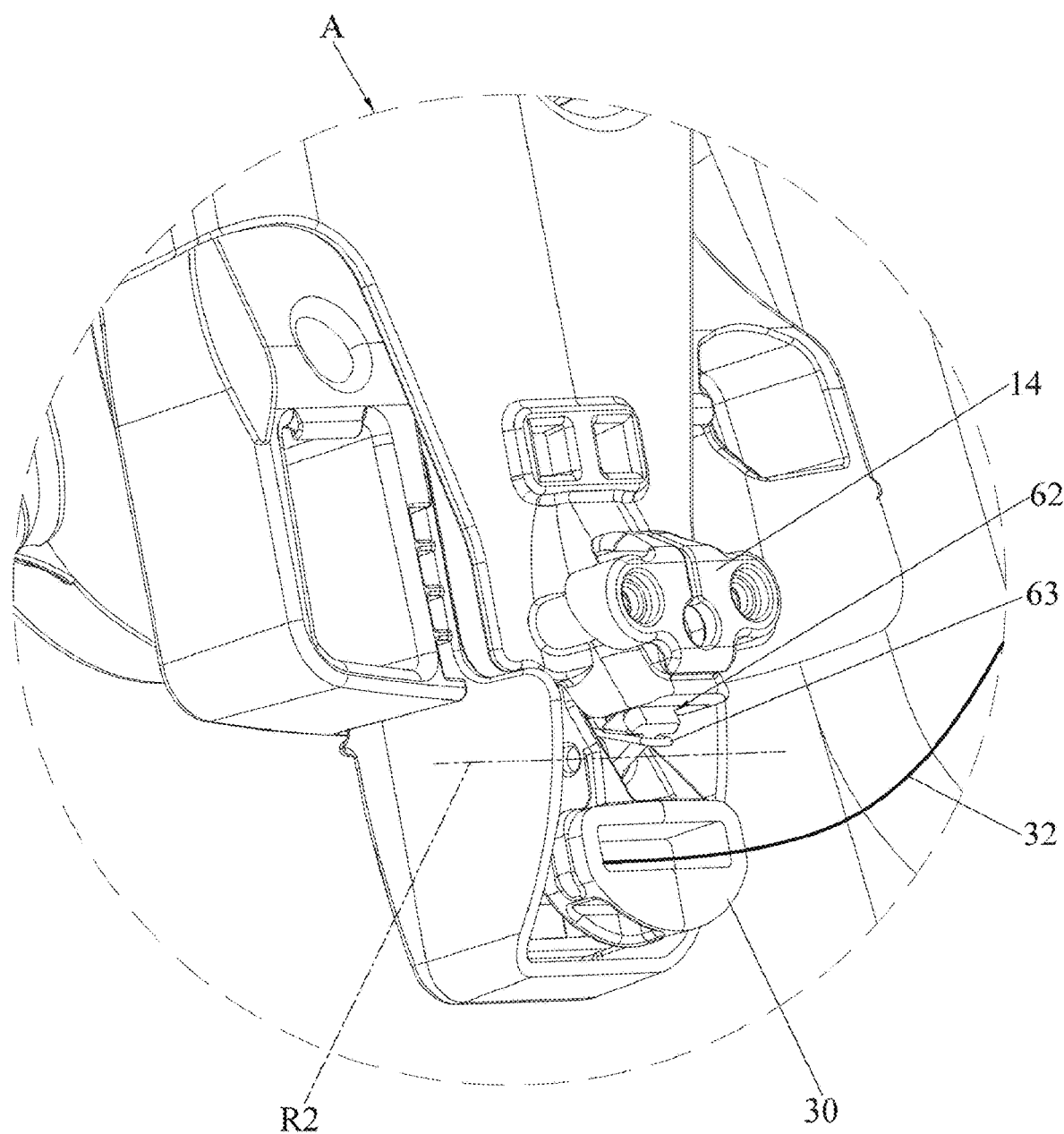
FIG. 11 is an enlarged diagram of an A portion of the stroller shown in FIG. 10 according to the third embodiment of the present invention.
Figure 12:
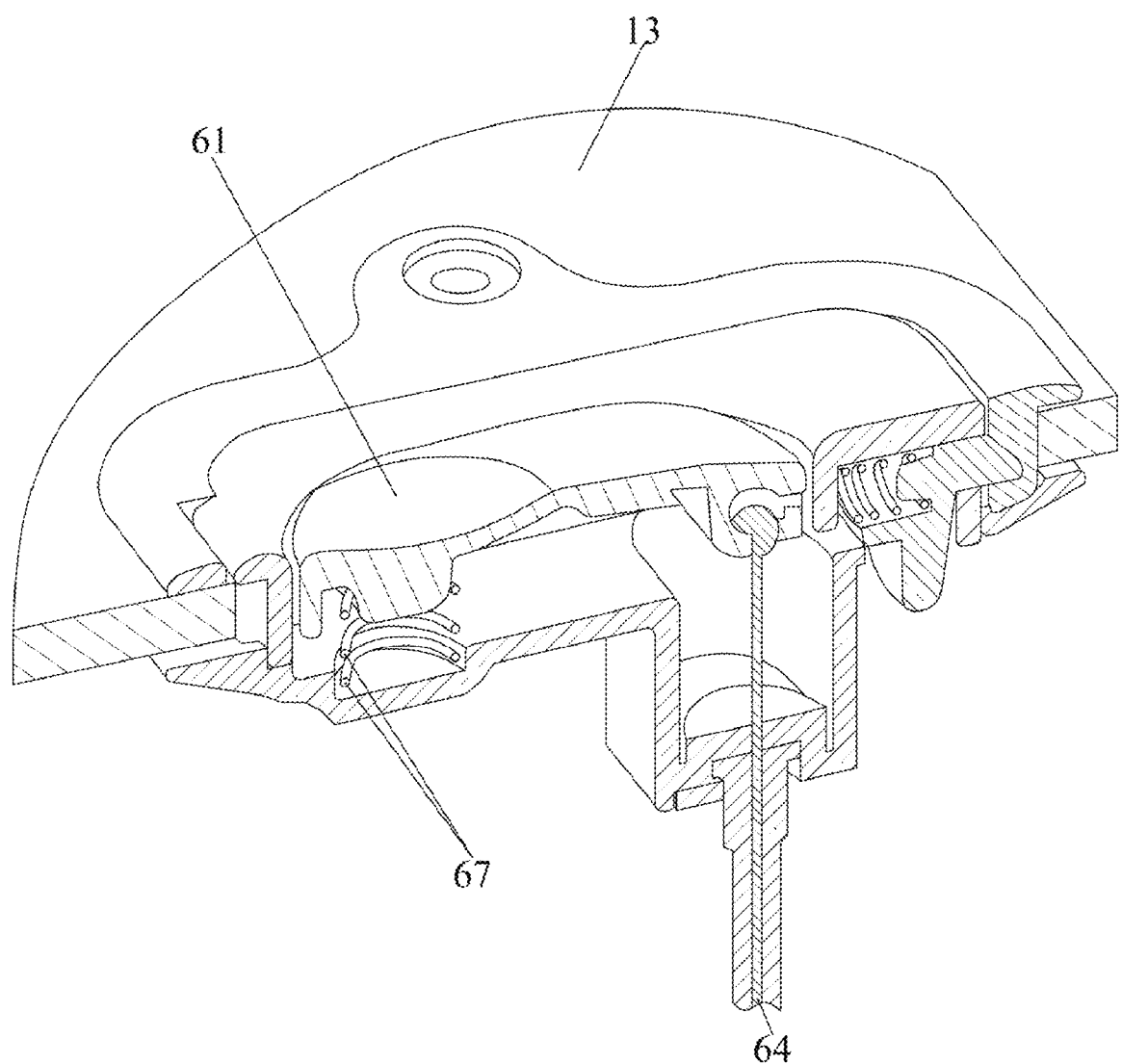
FIG. 12 is a partial internal structural diagram of the stroller according to the third embodiment of the present invention.
Figure 13:
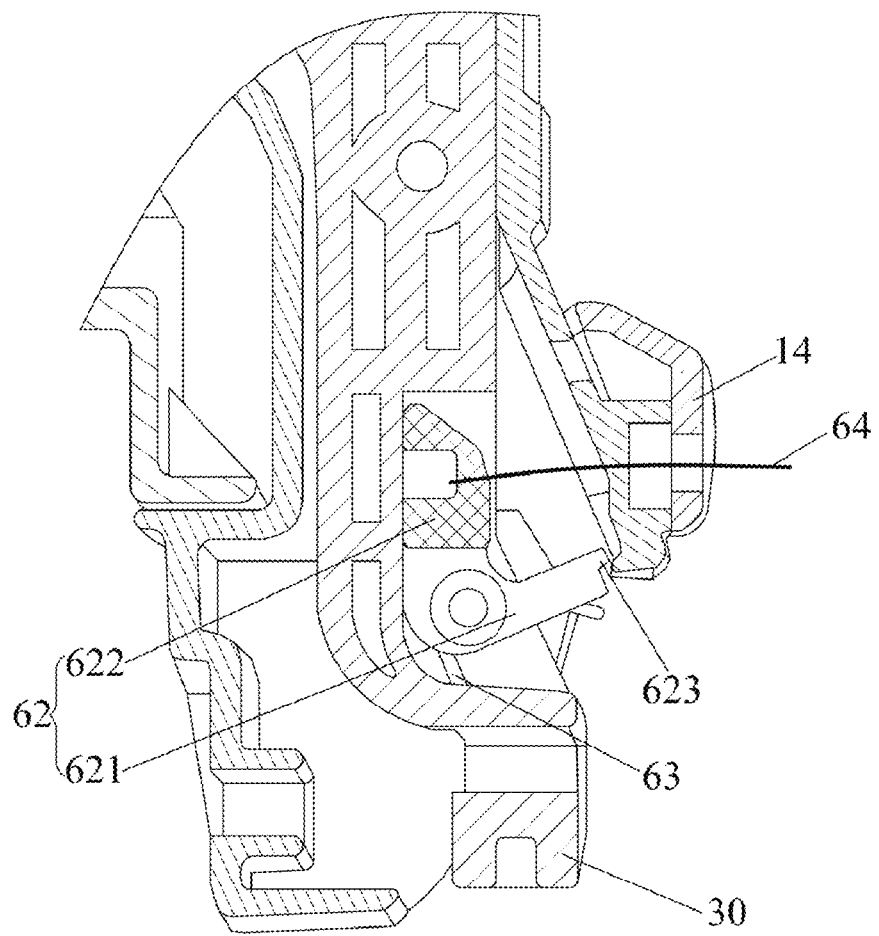
FIG. 13 is a partial internal structural diagram of the stroller as a safety lock is in a blocking state according to the third embodiment of the present invention.
Figure 14:
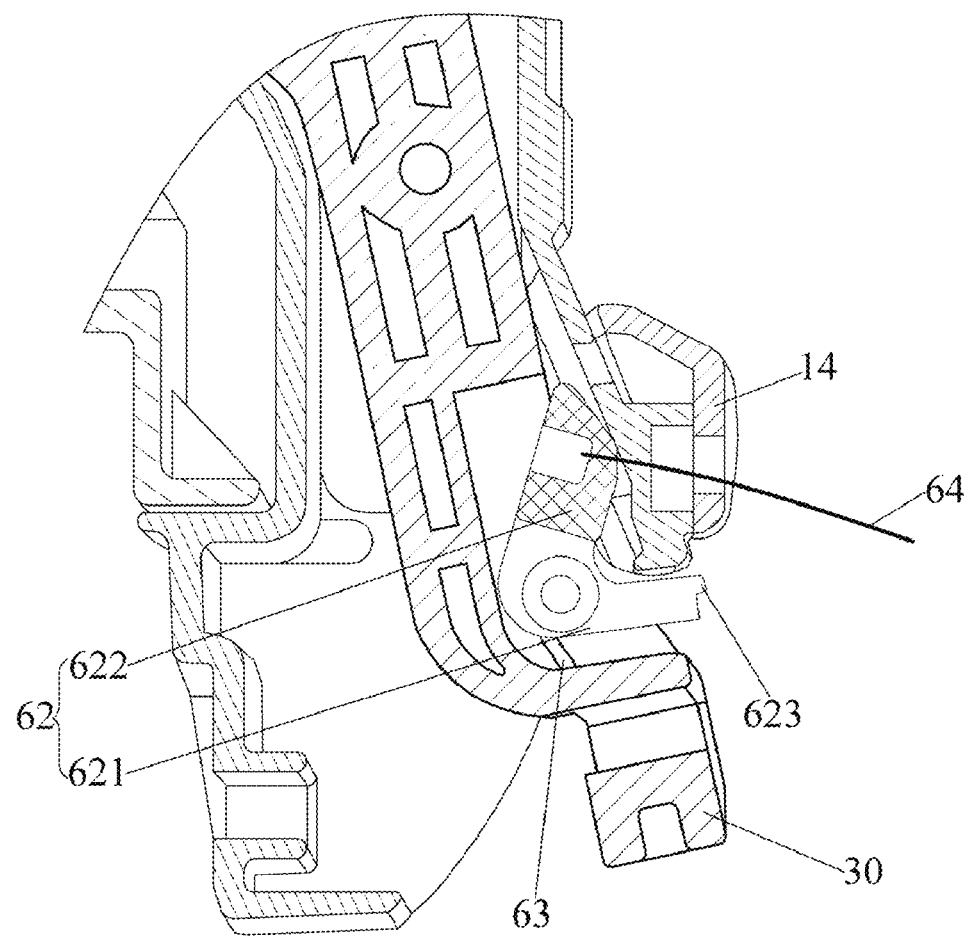
FIG. 14 is a partial internal structural diagram of the stroller as the safety lock is in a releasing state according to the third embodiment of the present invention.
Figure 15:
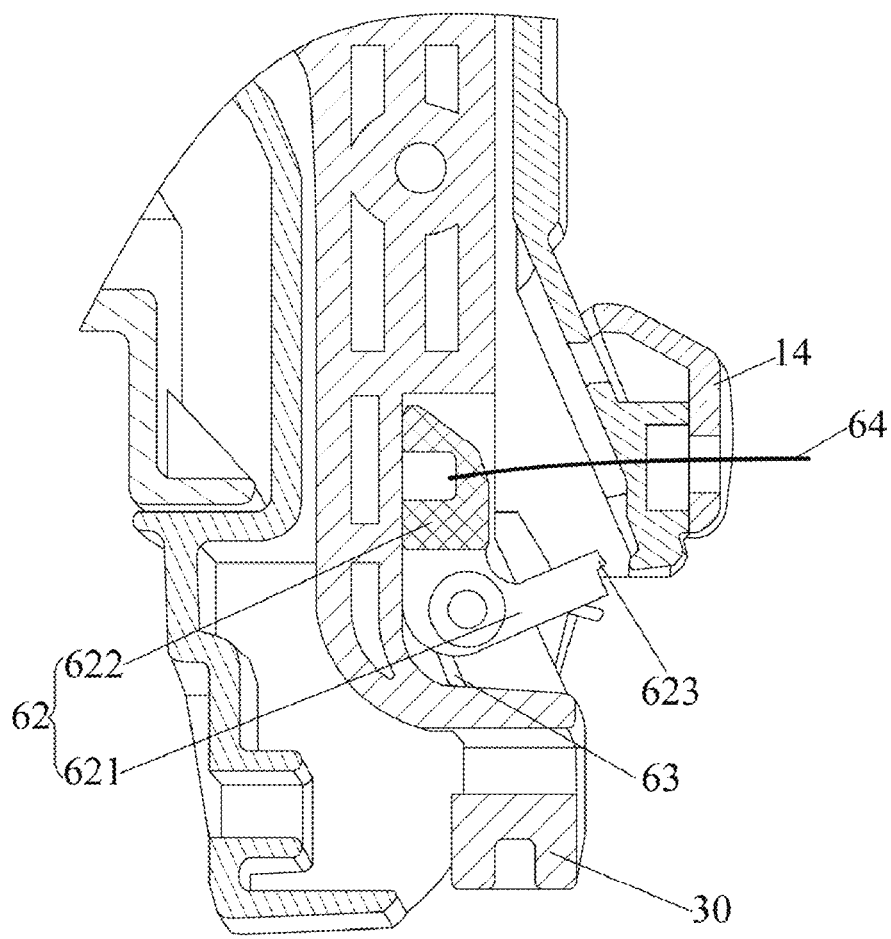
FIG. 15 is a partial internal structural diagram of the stroller as the stroller is in a folded state according to the third embodiment of the present invention.

Please refer to FIG. 9 to FIG. 15. FIG. 9 is a schematic diagram of a stroller 100c according to a third embodiment of the present invention. FIG. 10 is a partial diagram of the stroller 100c according to the third embodiment of the present invention. FIG. 11 is an enlarged diagram of an A portion of the stroller 100c shown in FIG. 10 according to the third embodiment of the present invention. FIG. 12 is a partial internal structural diagram of the stroller 100c according to the third embodiment of the present invention. FIG. 13 is a partial internal structural diagram of the stroller 100c as a safety lock 60 is in a blocking state according to the third embodiment of the present invention. FIG. 14 is a partial internal structural diagram of the stroller 100c as the safety lock 60 is in a releasing state according to the third embodiment of the present invention. FIG. 15 is a partial internal structural diagram of the stroller 100c as the stroller 60 is in a folded state according to the third embodiment of the present invention. As shown in FIG. 9 to FIG. 15, the stroller frame 10, the locking device 20 and the frame releasing component 30 of this embodiment are similar to the ones of the first embodiment, but the stroller frame 10 of this embodiment further includes a seat plate 13 and a fixing base 14. Detailed description for those similar parts is omitted herein for simplicity. Furthermore, the safety lock 60 of this embodiment includes a releasing component 61, a locking component 62, a first resilient component 63, a linking component 64 and a third resilient component 67.

In this embodiment, the locking component 62 is located at a right lateral side of the stroller frame 10. The releasing component 61 can be a button structure and movably disposed on the seat plate of the stroller frame 10. Furthermore, preferably, in this embodiment, the seat plate 13 can be located at a front side of the stroller frame 10 for easy operation. However, it is not limited to this embodiment. For example, in another embodiment, the releasing component also can be movably disposed on the frame releasing component. Alternatively, in another embodiment, the seat plate can be located at a rear side of the stroller frame, and the locking component can be located a left lateral side of the stroller frame. The locking component 62 is pivotally disposed on the frame releasing component 30. However, it is not limited to this embodiment. For example, the locking component can be pivotally disposed on the stroller frame. The locking component 62 can move relative to the frame releasing component 30 between the blocking position as shown in FIG. 13, and the releasing position as shown in FIG. 14. When the locking component 62 is located at the blocking position, the locking component 62 abuts against the frame releasing component 30 and the stroller frame 10 for restraining movement of the frame releasing component 30 relative to the stroller frame 10. When the locking component 62 is located at the releasing position, the locking component 62 allows the movement of the frame releasing component 30 relative to the stroller frame 10. Furthermore, in this embodiment, the locking component 62 abuts against the fixing base 14 and the frame releasing component 30. However, it is not limited to this embodiment.

The first resilient component 63 can preferably be a torsional spring and disposed between the locking component 62 and the stroller frame 10. A first end of the first resilient component 63 abuts against the locking component 62, and a second end of the first resilient component 63 abuts against the stroller frame, so that the locking component 63 is biased to move to the blocking position by the first resilient component 63. However, it is not limited to this embodiment. For example, in another embodiment, the first resilient component can be a tension spring, and the first end and the second end of the first resilient component are connected to the locking component and the stroller frame respectively. Alternatively, in another embodiment, the locking component can be biased to move to move to the releasing position by the first resilient component.

The linking component 64 is disposed between the releasing component 61 and the locking component 62, so that the releasing component 61 can drive the locking component 62 to move by the linking component 64. However, it is not limited to this embodiment. Specifically, in this embodiment, a first end of the linking component 64 is connected to the releasing component 61, and a second end of the linking component 64 is connected to the locking component 62, so that the releasing component 61 can drive the locking component 62 to pivot by the linking component 64.

The third resilient component 67 can preferably be a compression spring and disposed between the stroller frame 10 and the releasing component 61. Specifically, the third resilient component 67 is disposed between the seat plate 13 and the releasing component 61. A first end of the third resilient component 67 abuts against the releasing component 61, and a second end of the third resilient component 67 abuts against the seat plate 13 of the stroller frame 10, so that the releasing component 61 is biased to recover by the third resilient component 67. However, it is not limited to this embodiment. For example, the third resilient component can be a tension spring, and the first end and the second end of the third resilient component are connected to the releasing component and the seat plate respectively. Alternatively, in another embodiment, the third resilient component can be omitted, and the releasing component can be recovered by the user manually.

Furthermore, it should be noticed that, in this embodiment, when the stroller frame 10 is folded, the locking component 62 at the blocking position does not abut against the frame releasing component 30, which ensures a smooth unfolding operation of the stroller frame 10.

As shown in FIG. 11 to FIG. 15, the frame releasing component 30 is pivotally disposed on the stroller frame 10, and the pivoting axis of the frame releasing component is substantially parallel to a pivoting axis of the locking component 62. However, it is not limited to this embodiment. For example, in another embodiment, the pivoting axis of the frame releasing component can be collinear to the pivoting axis of the locking component. Specifically, the frame releasing component 30 can be a handle structure. However, it is not limited thereto.

Besides, the locking component 62 includes a first abutting segment 621 and a second abutting segment 622 divided by the pivoting axis of the locking component 62. The first abutting segment 621 is for abutting against the fixing base 14 of the stroller frame 10. The second segment 622 is for abutting against the frame releasing component 30. A longitudinal direction of the first segment 621 intersects with a longitudinal direction of the second segment 622. Specifically, an included angle between the first abutting segment 621 and the second abutting segment 622 can be less than 90 degrees for ensuring a reliable abutment of the locking component 62 and the fixing base 14 and a reliable abutment of the locking component 62 and the frame releasing component 30. Preferably, the first abutting segment 621 includes an engaging hook 623 toward the fixing base 14, and the first end of the first resilient component 63 is connected to or abuts against the second abutting segment 622. However, it is not limited to this embodiment. For example, in another embodiment, the first end of the first resilient component can be connected to or abut against the first abutting segment.

Detailed description of operation of the stroller 100*c* is provided as follows. When it is desired to fold the stroller 100*c*, the releasing component 61 can be operated to drive the locking component 62 to pivot from the blocking position as shown in FIG. 13, to the releasing position as shown in FIG. 14, by the linking component 64. When the locking component 62 moves to the releasing position, the first resilient component 63 is resiliently deformed, and the locking component 62 does not abut against the frame releasing component 30 and the fixing base 14, so as to allow the frame releasing component 30 to drive the locking device 20 to unlock the stroller frame 10. In other words, after the releasing component 61 to drive the locking component 62 move to the releasing positions, the stroller frame 10 is allowed to be folded.

Figure 16:
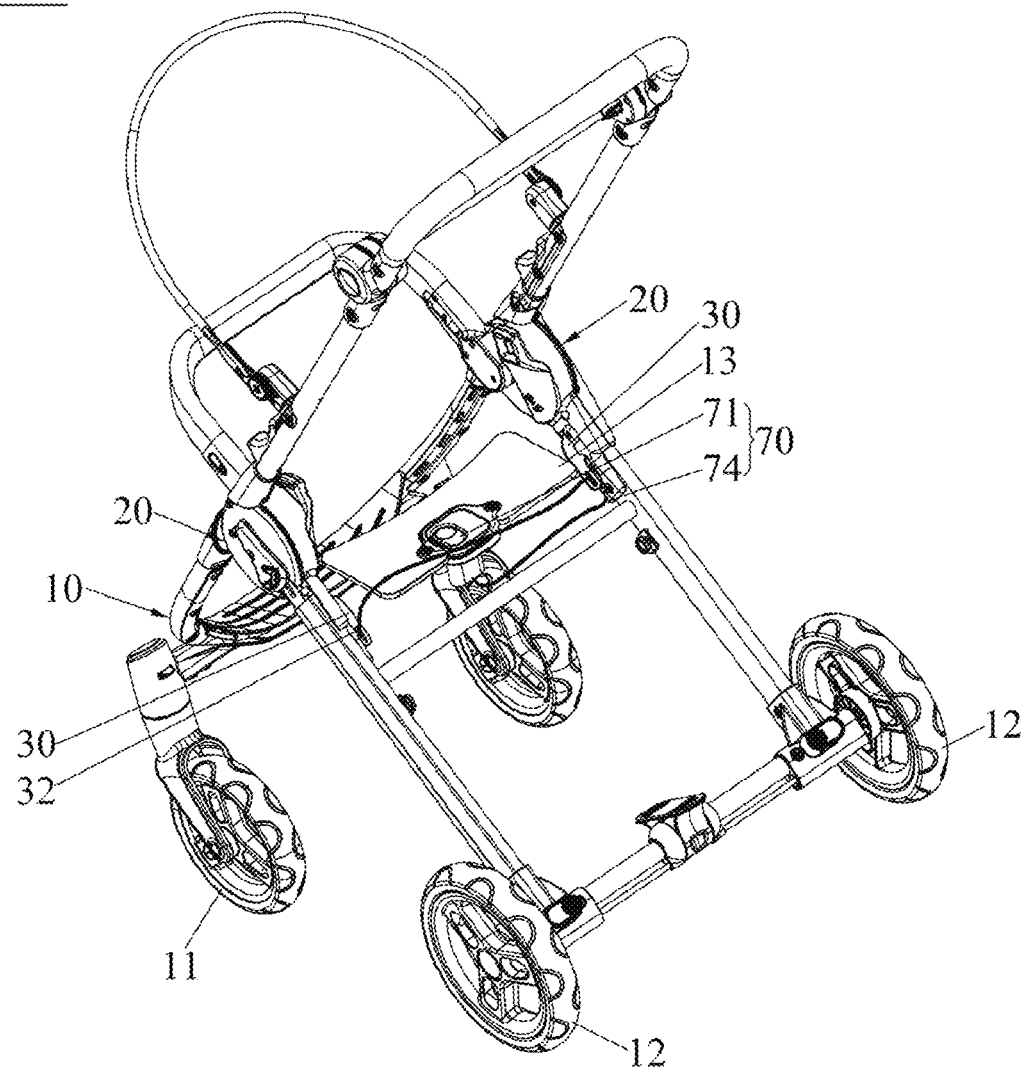
FIG. 16 is a schematic diagram of a stroller according to a fourth embodiment of the present invention.
Figure 17:
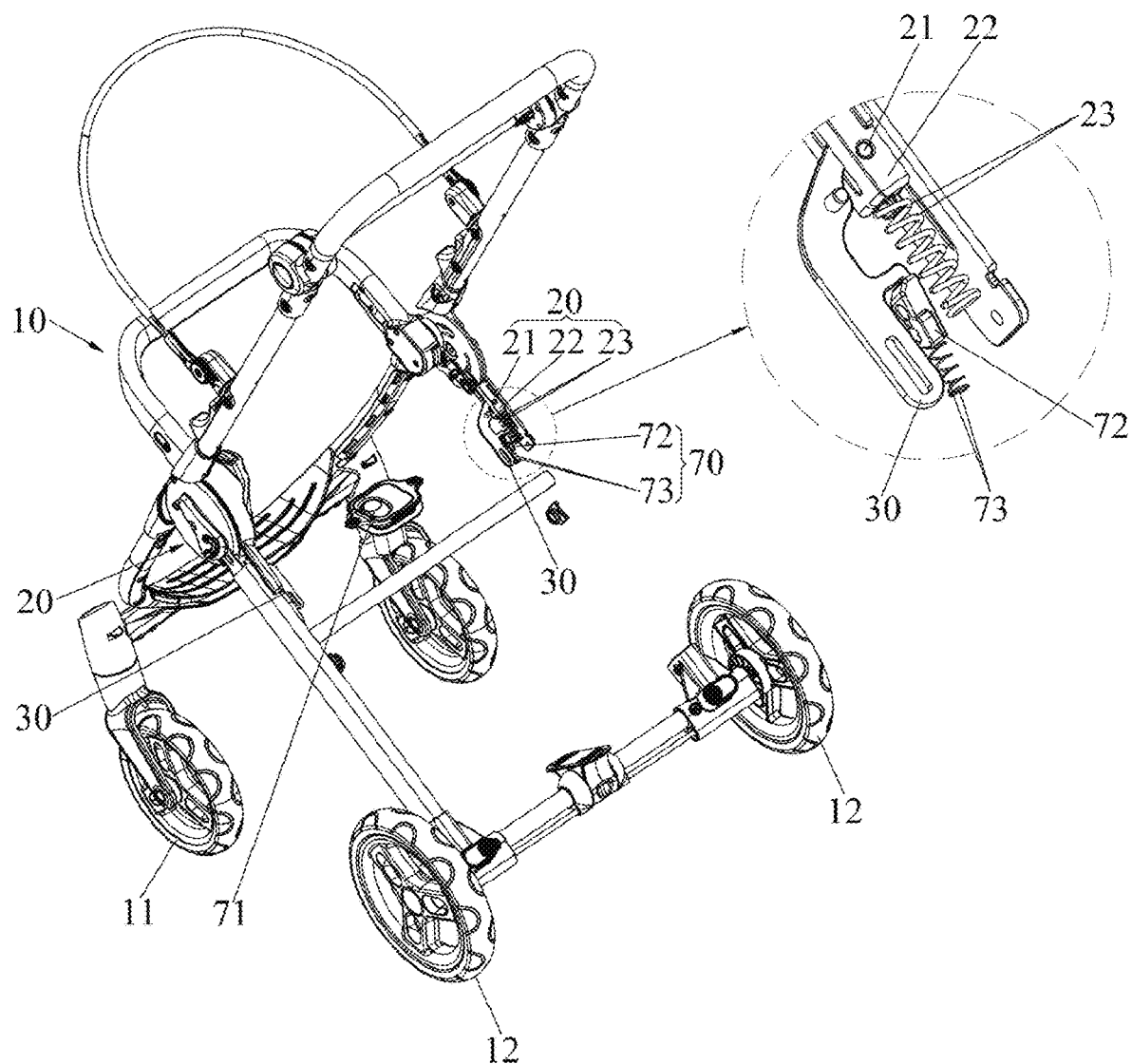
FIG. 17 is a partial diagram of the stroller according to the fourth embodiment of the present invention.
Figure 18:
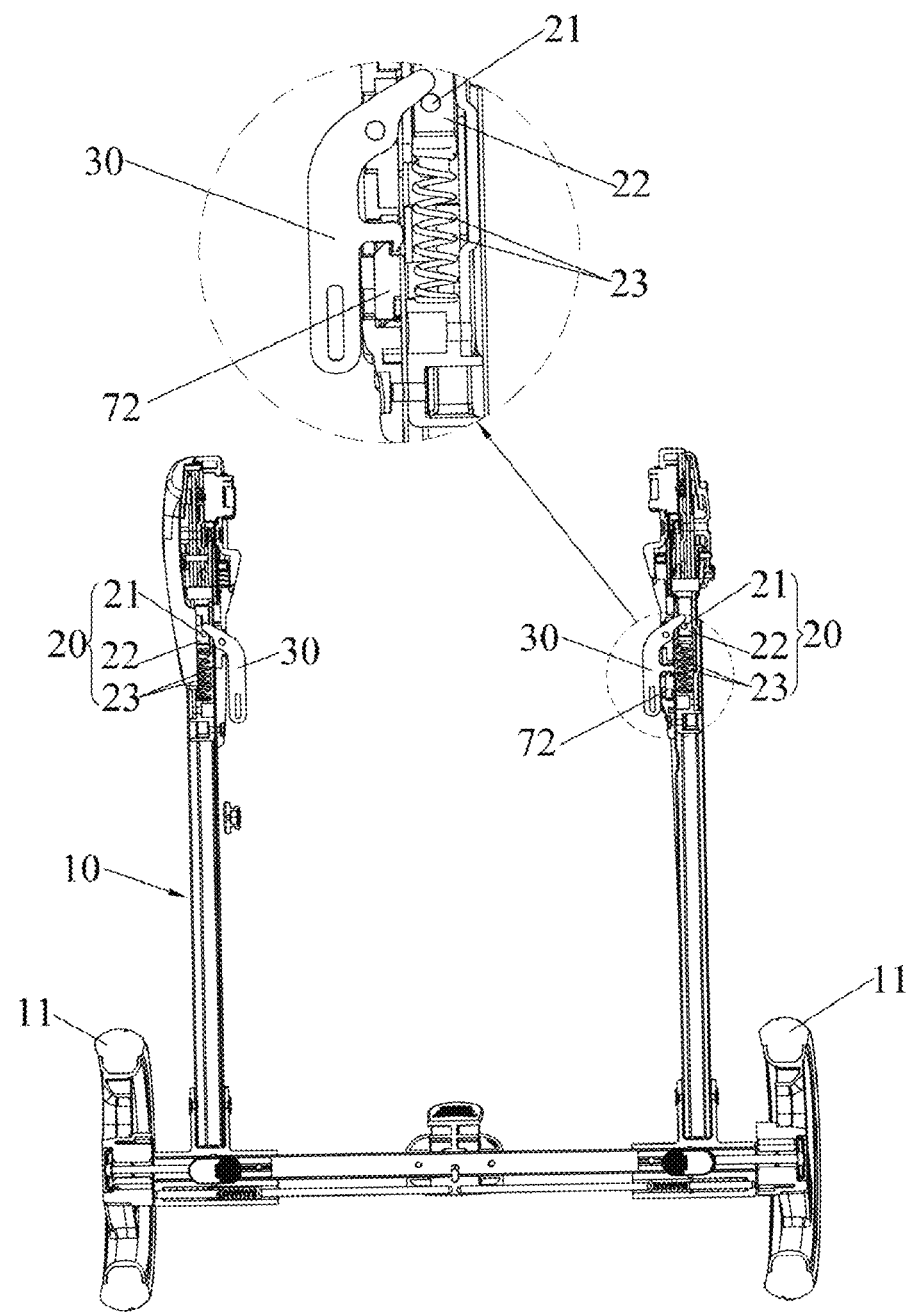
FIG. 18 is a partial diagram of the stroller as a safety lock is in a blocking state according to the fourth embodiment of the present invention.
Figure 19:
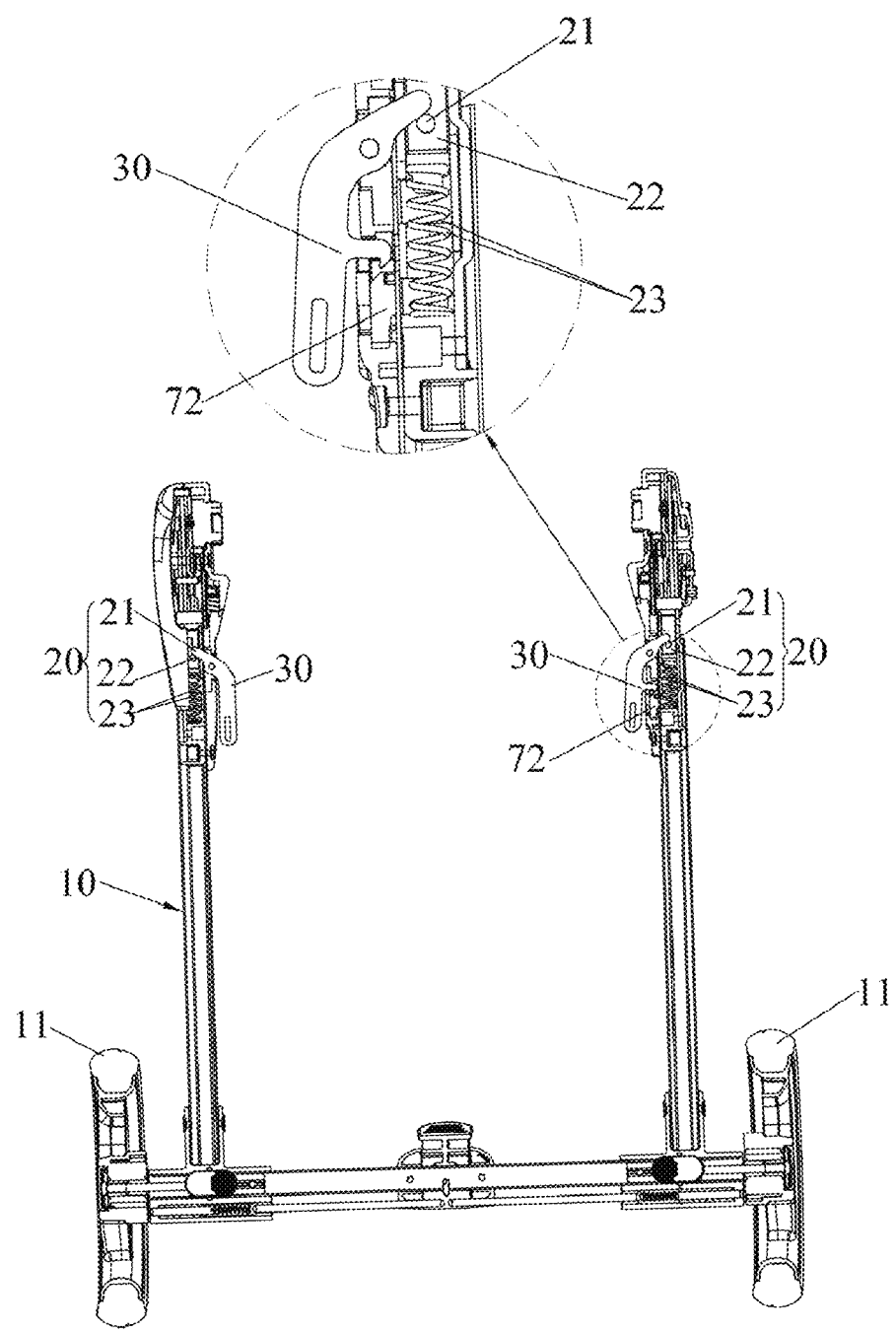
FIG. 19 is a partial diagram of the stroller as the safety lock is in a releasing state according to the fourth embodiment of the present invention.
Figure 20:
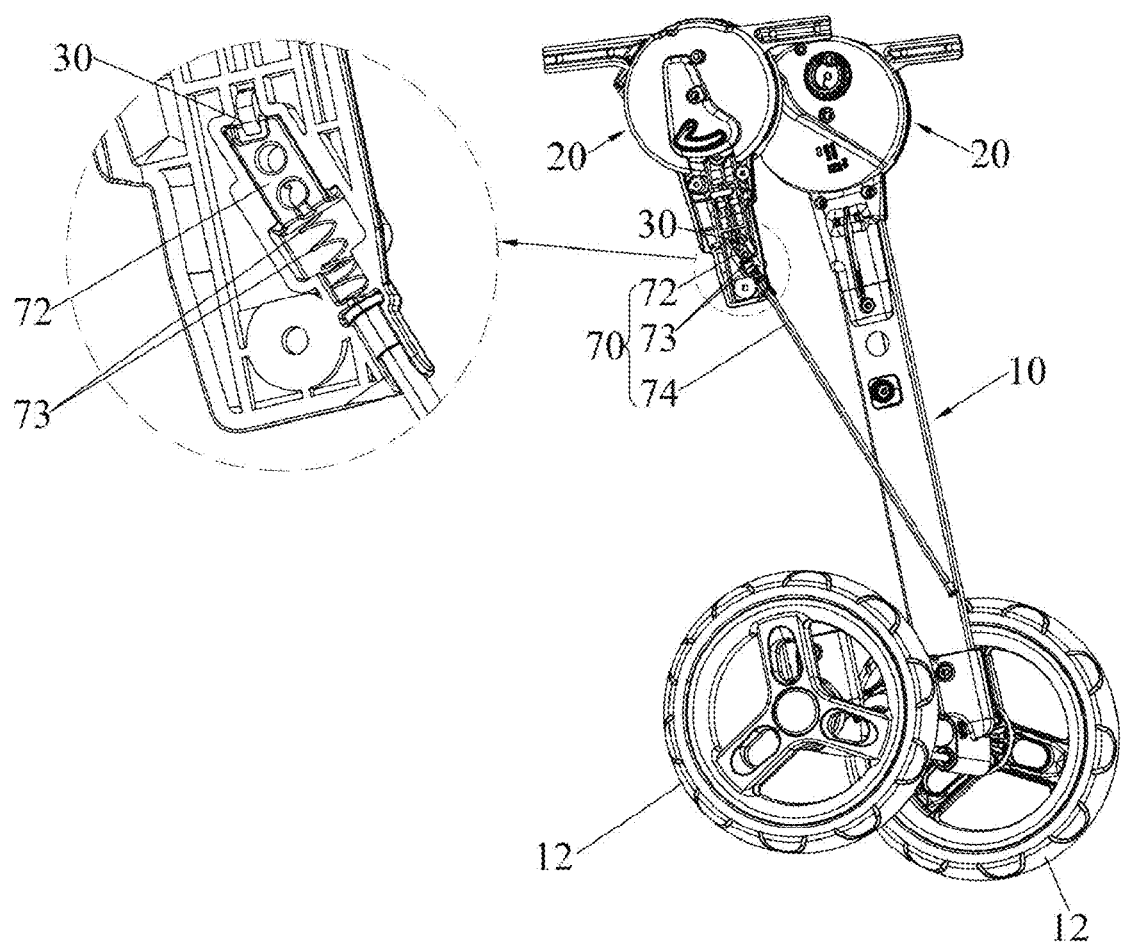
FIG. 20 is a partial diagram of the stroller at another view as the safety lock is in the blocking state according to the fourth embodiment of the present invention.
Figure 21:
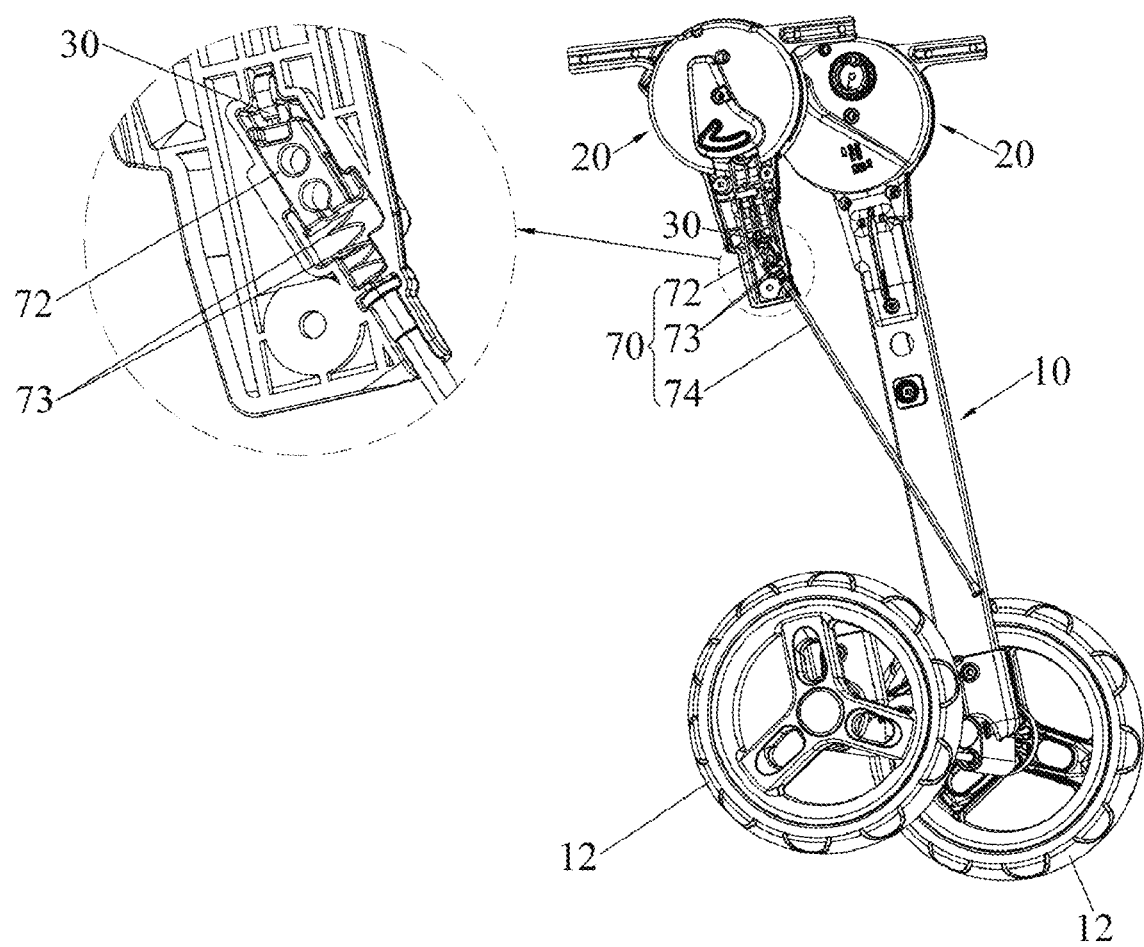
FIG. 21 is a partial diagram of the stroller at another view as the safety lock is in the releasing state according to the fourth embodiment of the present invention.

Please refer to FIG. 16 to FIG. 21. FIG. 16 is a schematic diagram of a stroller 100*d* according to a fourth embodiment of the present invention. FIG. 17 is a partial diagram of the stroller 100*d* according to the fourth embodiment of the present invention. FIG. 18 is a partial diagram of the stroller 100*d* as a safety lock 70 is in a blocking state according to the fourth embodiment of the present invention. FIG. 19 is a partial diagram of the stroller 100*d* as the safety lock 70 is in a releasing state according to the fourth embodiment of the present invention. FIG. 20 is a partial diagram of the stroller 100*d* at another view as the safety lock 70 is in the blocking state according to the fourth embodiment of the present invention. FIG. 21 is a partial diagram of the stroller 100*d* at another view as the safety lock 70 is in the releasing state according to the fourth embodiment of the present invention. As shown in FIG. 16 to FIG. 21, different from the first embodiment, the stroller 100*d* is a four-wheel stroller. The stroller frame 10, the locking device 20 and the frame releasing component 30 of this embodiment are similar to the ones of the first embodiment, but the stroller frame 10 includes the seat plate 13. Detailed description for those similar parts is omitted herein for simplicity. Furthermore, the safety lock 70 of this embodiment includes a releasing component 71, a locking component 72, a first resilient component 73, a linking component 74 and a third resilient component, which is not shown in the figures. In this embodiment, the releasing component 71 can be a button structure and movably disposed on the seat plate 13 of the stroller frame 10. The locking component 72 is movably disposed on the stroller frame 10 and slidable relative to the stroller frame between a blocking position as shown in FIG. 18, and a releasing position as shown in FIG. 19. However, it is not limited to this embodiment. For example, in another embodiment, the locking component can be movably disposed on the frame releasing component.

Preferably, the locking component 72 engages with the frame releasing component 30 when the locking component 72 is located at the blocking position. However, it is not limited to this embodiment. The first resilient component 73 can preferably be a torsional spring and disposed between the locking component 72 and the stroller frame 10. A first end of the first resilient component 73 abuts against the locking component 72, and a second end of the first resilient component 73 abuts against the stroller frame 10, so that the locking component 72 is biased to move to the blocking position by the first resilient component 73. However, it is not limited to this embodiment. For example, the first resilient component can be a tension spring, and the first end and the second end of the first resilient component are connected to the locking component and the stroller frame respectively. Alternatively, in another embodiment, the locking component can be biased to move to the releasing position.

The linking component 74 is disposed between the releasing component 71 and the locking component 72, so that the releasing component 71 can drive the locking component 72 by the linking component 74 to move from the blocking position to the releasing position. Specifically, in this embodiment, a first end of the linking component 74 is connected to the releasing component 71, and a second end of the linking component 74 is connected to the locking component 72. However, it is not limited to this embodiment.

The third resilient component can preferably be a compression spring and disposed between the releasing component 71 and the stroller frame 10. Specifically, in this embodiment, since the releasing component is disposed on the seat plate 13 of the stroller frame 10, the third resilient component is disposed between the releasing component 71 and the seat plate 13, and a first end and a second end of the third resilient component abut against the releasing component 71 and the seat plate 13 respectively, so that the releasing component 71 is biased to recover by the third resilient component. However, it is not limited to this embodiment. For example, in another embodiment, the third resilient component can be a tension spring, and the first end and the second end of the third resilient component are connected to the releasing component and the seat plate respectively. Alternatively, in another embodiment, the third resilient component can be omitted, and the releasing component can be recovered by the user manually.

Furthermore, in this embodiment, the seat plate 13 is located at the front side of the stroller frame 10, and the locking component 72 is located at the right lateral side of the stroller frame 10. However, it is not limited to this embodiment. For example, in another embodiment, the seat plate can be disposed on the rear side of the stroller frame, and the locking component can be located at the left lateral side of the stroller frame.

As shown in FIG. 18 to FIG. 21, the frame releasing component 30 is pivotally disposed on the stroller frame 10, and a moving direction of the locking component 72 is not parallel to the pivoting axis of the frame releasing component 30 for easy engagement and disengagement of the locking component 72 and the frame releasing component 30. Furthermore, the frame releasing component can be a handle structure. However, it is not limited to this embodiment.

As shown in FIG. 18 to FIG. 21, in this embodiment, each locking device 20 includes a pin 21, a sliding block 22 and a recovering component 23. The sliding block 22 is movably disposed on the stroller frame 10. Preferably, a moving direction of the sliding block 22 is substantially parallel to the direction of the locking component 72. However, it is not limited to this embodiment. The pin 21 is installed on the sliding block 22. The recovering component 23 is a compression spring. A first end of the recovering component 23 abuts against the sliding block 22, and a second end of the recovering component 23 abuts against the stroller frame 10, so that the sliding block 22 is biased to slide by the recovering component 23 for pushing the frame releasing component 30 to recover to a recovering position with the pin 21. When the frame releasing component 30 is located at the recovering position, the locking component 72 can move to the blocking position to engage with the frame releasing component 30. When the locking component 72 moves to the releasing position, the frame releasing component 30 is allowed to pivot outwardly to drive the sliding block 22 by the pin 21 for allowing the stroller frame 10 to be folded.

In this embodiment, the recovering component 23 can be a tension spring, and a first end and a second of the recovering component 23 can be connected to the sliding block 23 and the stroller frame 10 respectively. However, it is not limited to this embodiment.

Detailed description of operation of the stroller 100d is provided as follows. When it is desired to fold the stroller 100d, the releasing component 71 can be operated to drive the locking component 72 to move from the blocking position as shown in FIG. 18, to the releasing position as shown in FIG. 19, by the linking component 74. When the locking component 72 moves to the releasing position, the first resilient component 73 is resiliently deformed, and the locking component 72 disengages from the frame releasing component 30, so as to allow the frame releasing component 30 to drive the locking device 20 to unlock the stroller frame 10. In other words, after the releasing component 71 to drive the locking component 72 move to the releasing positions, the stroller frame 10 is allowed to be folded.

Figure 22:
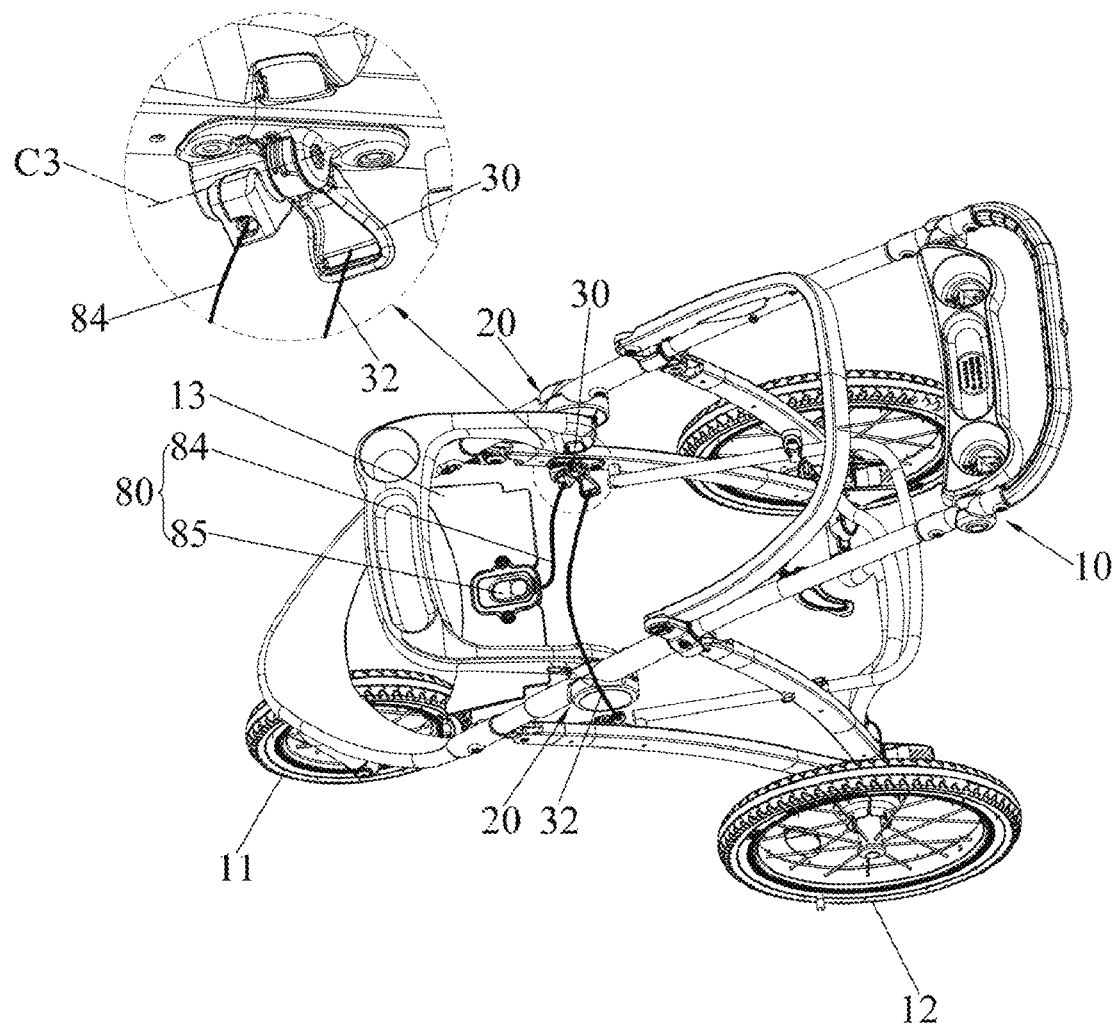
FIG. 22 is a schematic diagram of a stroller according to a fifth embodiment of the present invention.
Figure 23:
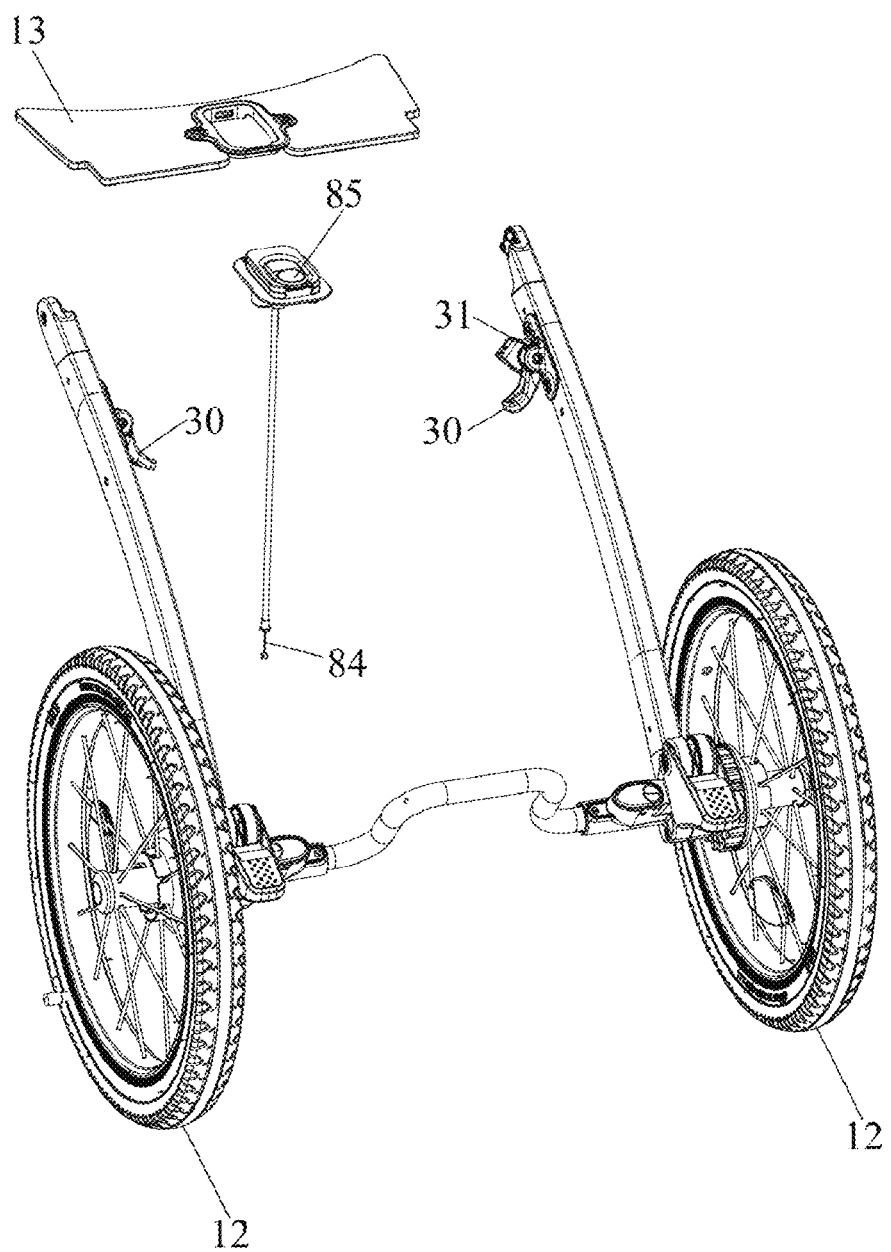
FIG. 23 is a partial diagram of the stroller according to the fifth embodiment of the present invention.
Figure 24:
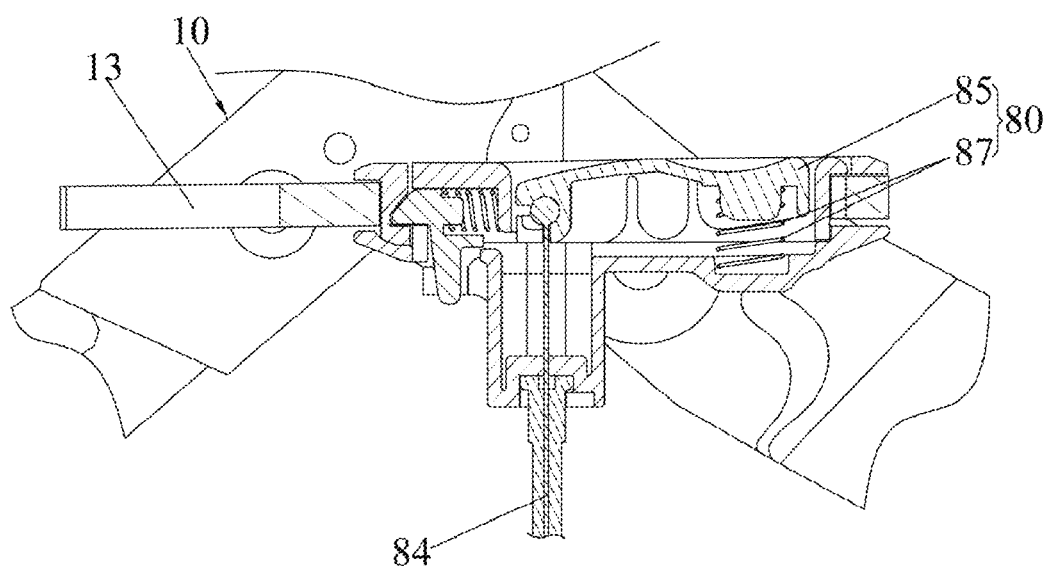
FIG. 24 is a partial internal structural diagram of the stroller according to the fifth embodiment of the present invention.
Figure 25:
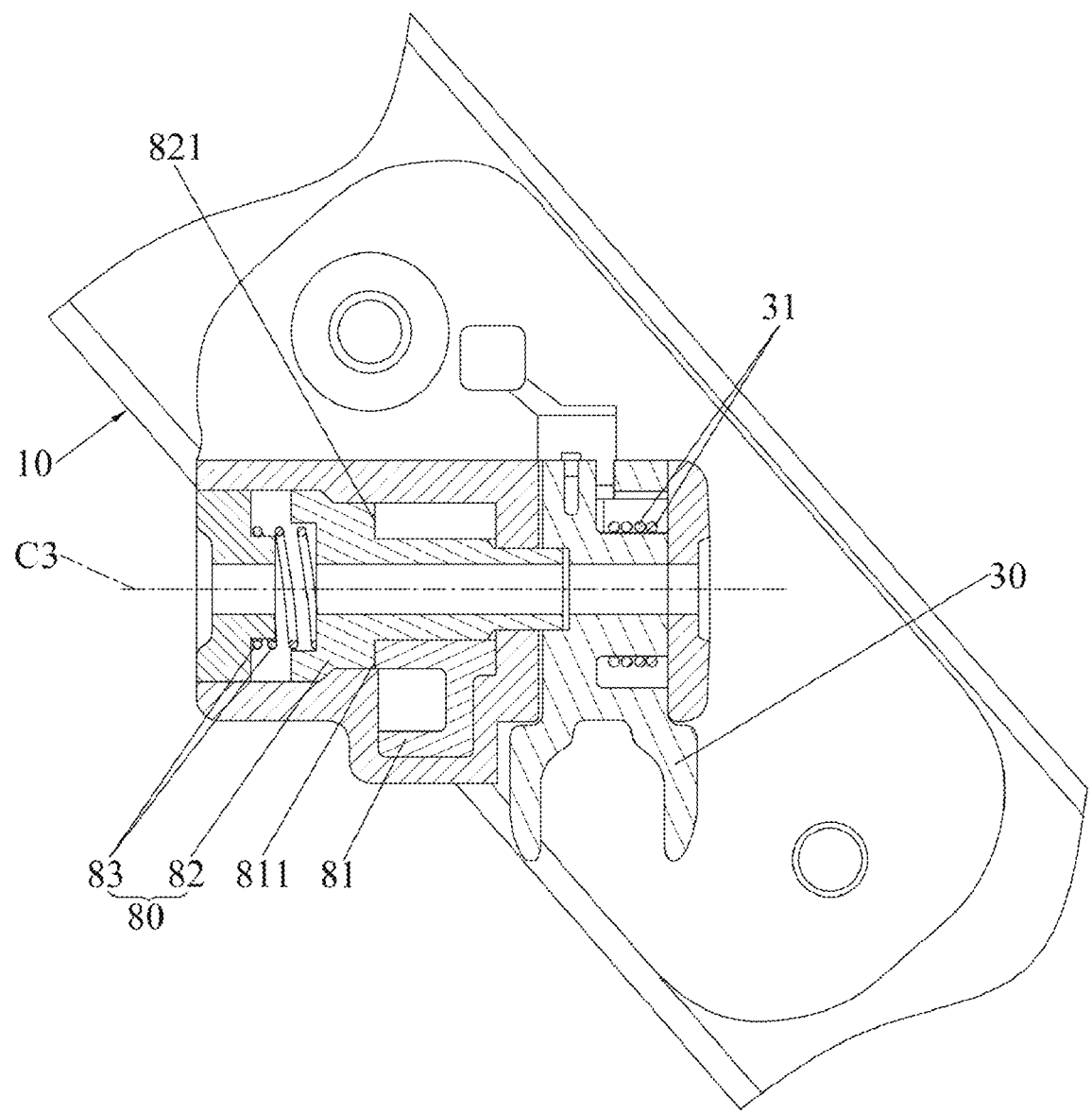
FIG. 25 is a partial internal structural diagram of the stroller as a safety lock is in a blocking state according to the fifth embodiment of the present invention.
Figure 26:
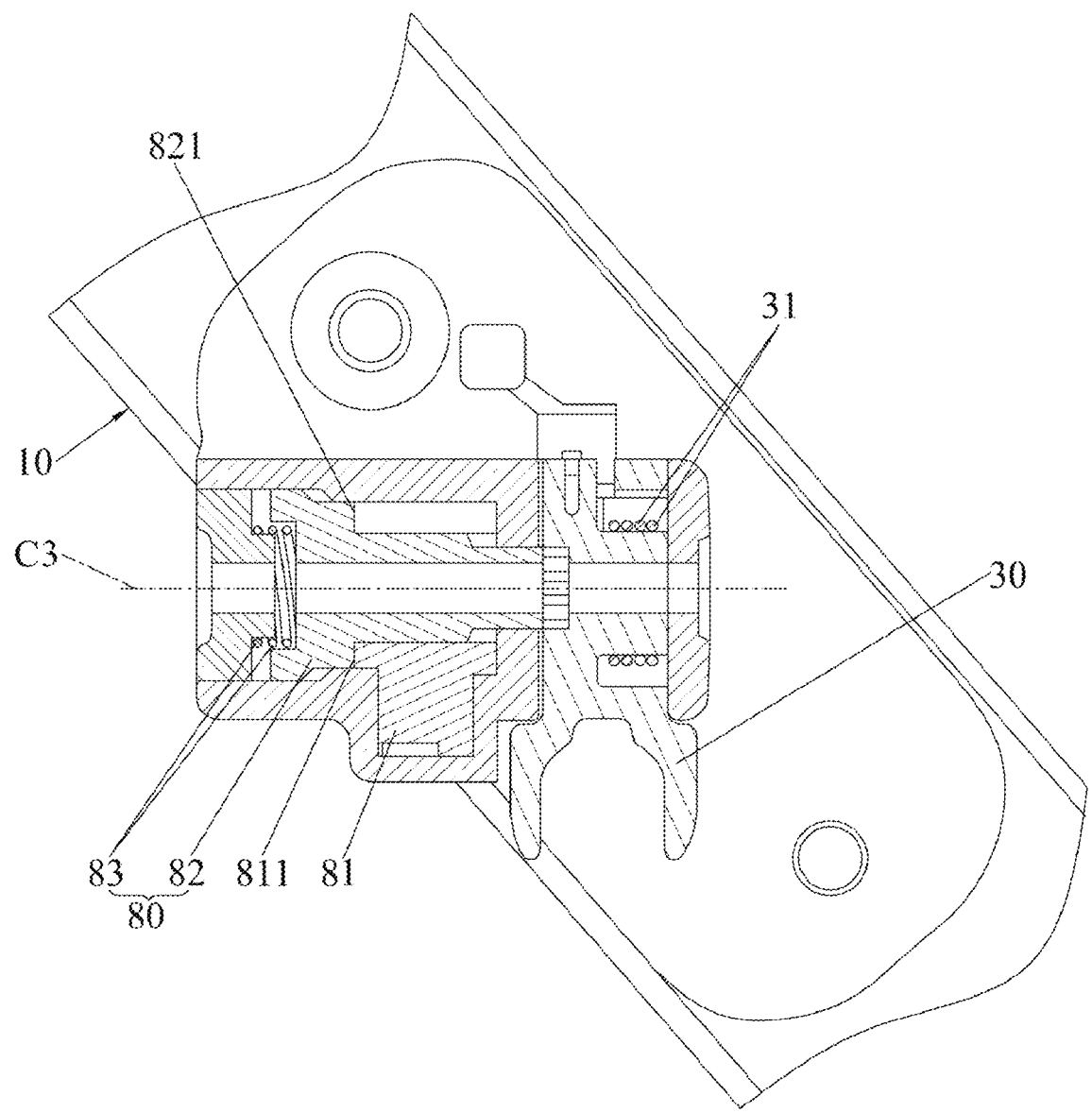
FIG. 26 is a partial internal structural diagram of the stroller as the safety lock is in a releasing state according to the fifth embodiment of the present invention.

Please refer to FIG. 22 to FIG. 26. FIG. 22 is a schematic diagram of a stroller 100e according to a fifth embodiment of the present invention. FIG. 23 is a partial diagram of the stroller 100e according to the fifth embodiment of the present invention. FIG. 24 is a partial internal structural diagram of the stroller 100e according to the fifth embodiment of the present invention. FIG. 25 is a partial internal structural diagram of the stroller 100e as a safety lock 80 is in a blocking state according to the fifth embodiment of the present invention. FIG. 26 is a partial internal structural diagram of the stroller 100e as the safety lock 80 is in a releasing state according to the fifth embodiment of the present invention. As shown in FIG. 22 to FIG. 26, different from the first embodiment, the stroller 100e of this embodiment is a four-wheel stroller, and the stroller frame 10 includes the seat plate 13. Furthermore, the safety lock 80 of this embodiment includes a releasing component 81, a locking component 82, a first resilient component 83, a linking component 84, an operating component 85, a second resilient component 87 and a third resilient component, which is not shown in the figures.

The operating component 85 can be a button structure and movably disposed on the seat plate 13 of the stroller frame 10. Preferably, the seat plate 13 is located at the front side of the stroller frame 10 for easy operation. However, it is not limited to this embodiment. The locking component 82 is movably disposed on the stroller frame 10. However, it is not limited to this embodiment. For example, in another embodiment, the locking component can be movably disposed on the frame releasing component 30. The locking component 82 is slidable relative to the frame releasing component 30 between a blocking position as shown in FIG. 25, and a releasing position as shown in FIG. 26. Preferably, in this embodiment, the locking component 82 engages with the frame releasing component 30 for restraining the frame releasing component 30 from driving the locking device 20 to unlock the stroller frame 10 or disengages from the frame releasing component 30 for allowing the frame releasing component 30 to driving the locking device 20 to unlock the stroller frame 10. However, it is not limited to this embodiment.

The first resilient component 83 can preferably be a compression spring and disposed between the locking component 82 and the stroller frame 10. A first end of the first resilient component 83 abuts against the locking component 82, and a second end of the first resilient component 83 abuts against the stroller frame 10, so that the locking component 82 is biased to move to the blocking position by the first resilient component 83. However, it is not limited to this embodiment. For example, in another embodiment, the first resilient component can be a tension spring, and the first end and the second end of the first resilient component can be connected to the locking component and the stroller frame respectively. Alternatively, in another embodiment, the locking component can be biased to move to the releasing position by the first resilient component.

The linking component 84 is disposed between the operating component 85 and the releasing component 81, so that the operating component 85 can drive the releasing component 81 by the linking component 84 to drive the locking component 82 to move from the blocking position to the releasing position. The releasing component 81 is movably disposed on the stroller frame 10. A first end of the linking component 84 is connected to the operating component 85, and a second end of the linking component 84 is connected to the releasing component 81. Specifically, in this embodiment, the locking component 82 can be driven by the first resilient component 83 and the releasing component 81 to move between the blocking position and the releasing position. However, it is not limited to this embodiment.

The third resilient component is disposed between the releasing component 81 and the stroller frame, so that the releasing component 81 is biased to recover by the third resilient component.

The second resilient component 87 can preferably be a compression spring and disposed between the operating component 85 and the stroller frame 10. Specifically, since the operating component 85 is disposed on the seat plate 13, the second resilient component 87 is disposed between the operating component 85 and the seat plate 13, and a first end and a second end of the second resilient component 85 abut against the operating component 85 and the seat plate 13 respectively, so that the operating component 85 is biased to recover by the second resilient component. However, it is not limited to this embodiment. For example, in another embodiment, the second resilient component can be a tension spring, and the first end and the second end of the second resilient component are connected to the operating component and the seat plate. Alternatively, in another embodiment, the second resilient component can be omitted, and the operating component can be recovered by the user manually.

Furthermore, in this embodiment, the seat plate 13 is located at the front side of the stroller frame 10, and the locking component 82 is located at the right lateral side of the stroller frame 10. However, it is not limited to this embodiment. For example, in another embodiment, the seat plate can be disposed on the rear side of the stroller frame, and the locking component can be located at the left lateral side of the stroller frame.

As shown in FIG. 22 to FIG. 26, the releasing component 81 is pivotally disposed on the stroller frame around a third pivoting axis C3. However, it is not limited to this embodiment. A moving direction of the locking component 82 is substantially parallel to the third pivoting axis C3 of the releasing component 81. Preferably, the locking component 82 passes through the releasing component 81 along the third pivoting axis C3 for simplification of assembly of the locking component 82 and the releasing component 81. However, it is not limited to this embodiment.

Specifically, the releasing component 81 includes a driving profile 851. The driving profile 851 includes a driving inclined surface formed on an outer periphery of the releasing component which contacts with the locking component. The locking component 82 includes an abutting profile 821 for cooperating with the driving profile. The locking component 82 can be driven by the first resilient component 83 and cooperation of the driving profile 851 and the abutting profile 821 to move between the releasing position and the blocking position. However, it is not limited to this embodiment. For example, in another embodiment, the abutting profile is formed on a portion of the locking component passing through a through slot of the releasing component, and the driving profile can include a driving inclined surface formed on an inner periphery of the through slot of the releasing component.

As shown in FIG. 25 and FIG. 26, the frame releasing component 30 is pivotally disposed on the stroller frame 10. Preferably, the third pivoting axis C3 of the releasing component 81 is substantially collinear to the pivoting axis of the frame releasing component 30, which achieves a coaxial configuration of the frame releasing component 30 and the releasing component 81 for easy engagement or disengagement of the locking component 82 and the frame releasing component 30. However, it is not limited to this embodiment. Specifically, the frame releasing component 30 and the releasing component 81 are arranged along the third pivoting axis C3 for making structure more compact. Furthermore, in this embodiment, the frame releasing component 30 can be a handle structure. However, it is not limited to this embodiment.

Detailed description of operation of the stroller 100e is provided as follows. When it is desired to fold the stroller 100e, the operating component 85 can be operated to drive the releasing component 81 to pivot around the third pivoting axis C3 by the linking component 84 to drive the locking component 82 to move from the blocking position as shown in FIG. 25, to the releasing position as shown in FIG. 26. When the locking component 82 moves to the releasing position, the first resilient component 83 is resiliently deformed, and the locking component 82 disengages from the frame releasing component 30, so as to allow the frame releasing component 30 to drive the locking device 20 to unlock the stroller frame 10. In other words, after the operating component 85 to drive the releasing component 81 to drive the locking component 82 move to the releasing positions, the stroller frame 10 is allowed to be folded.

Figure 27:
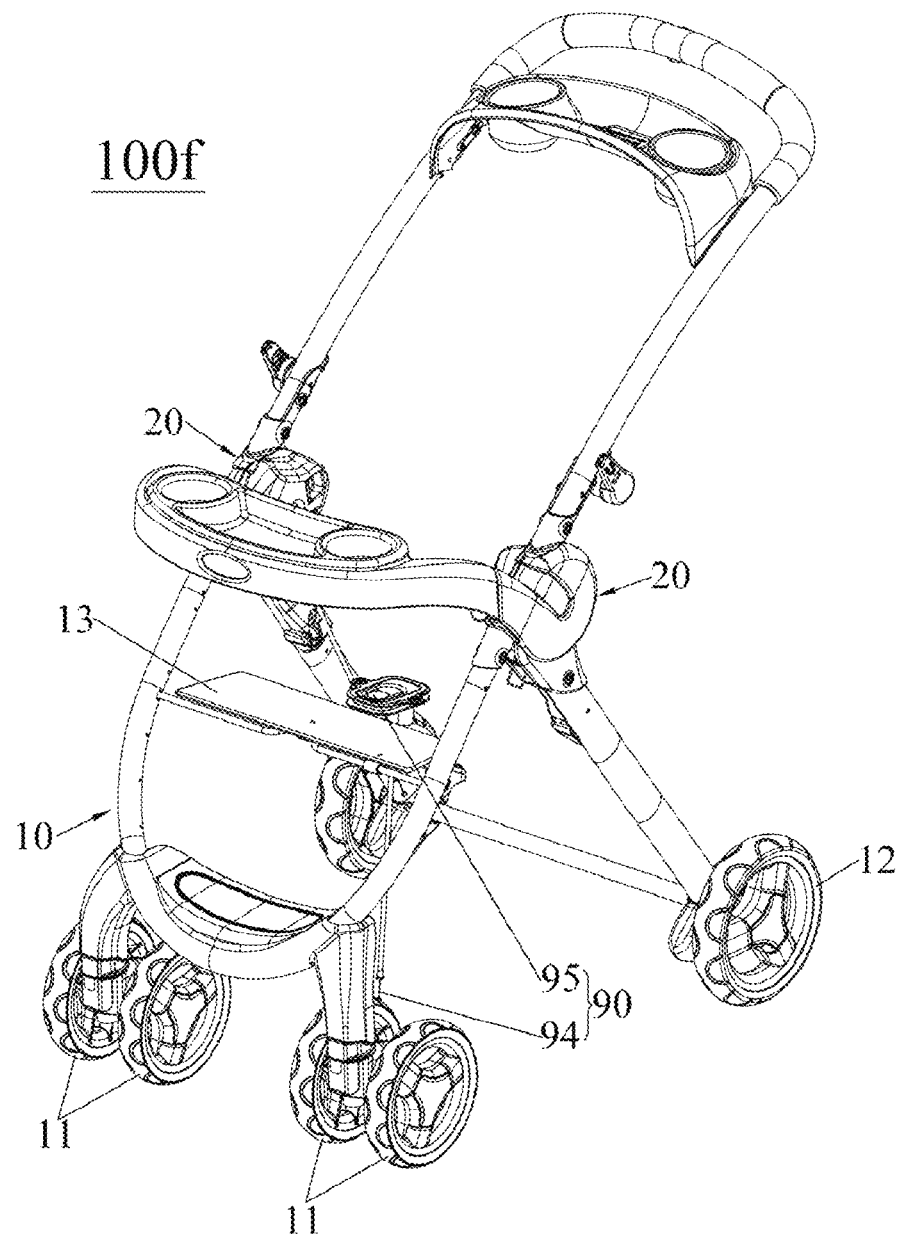
FIG. 27 is a schematic diagram of a stroller according to a sixth embodiment of the present invention.
Figure 28:
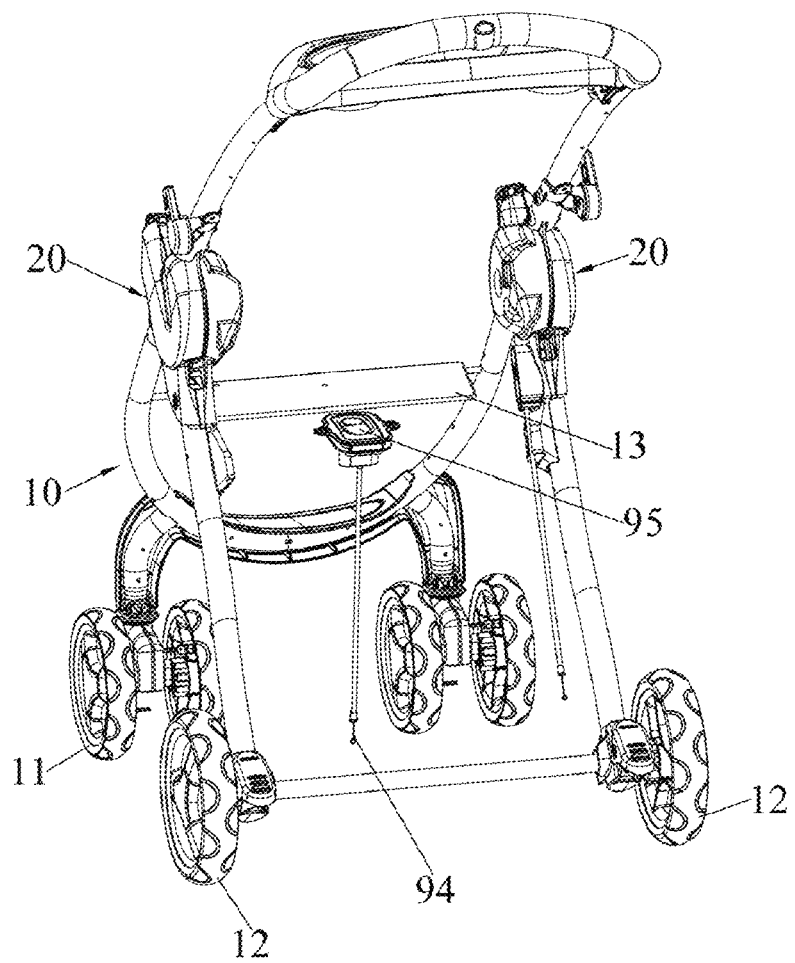
FIG. 28 is a partial diagram of the stroller according to the sixth embodiment of the present invention.
Figure 29:
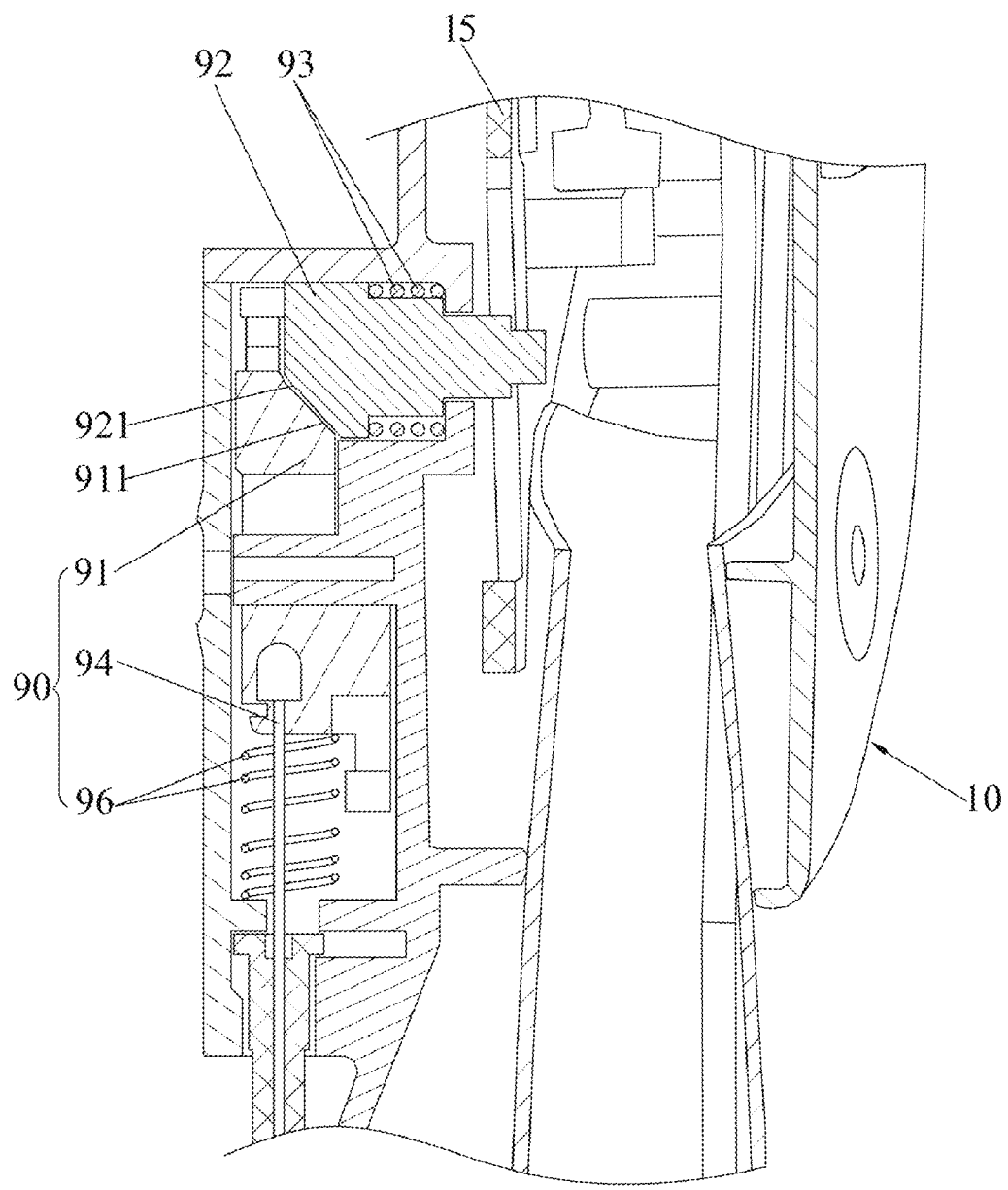
FIG. 29 is a partial internal structural diagram of the stroller as a safety lock is in a blocking state according to the sixth embodiment of the present invention.
Figure 30:
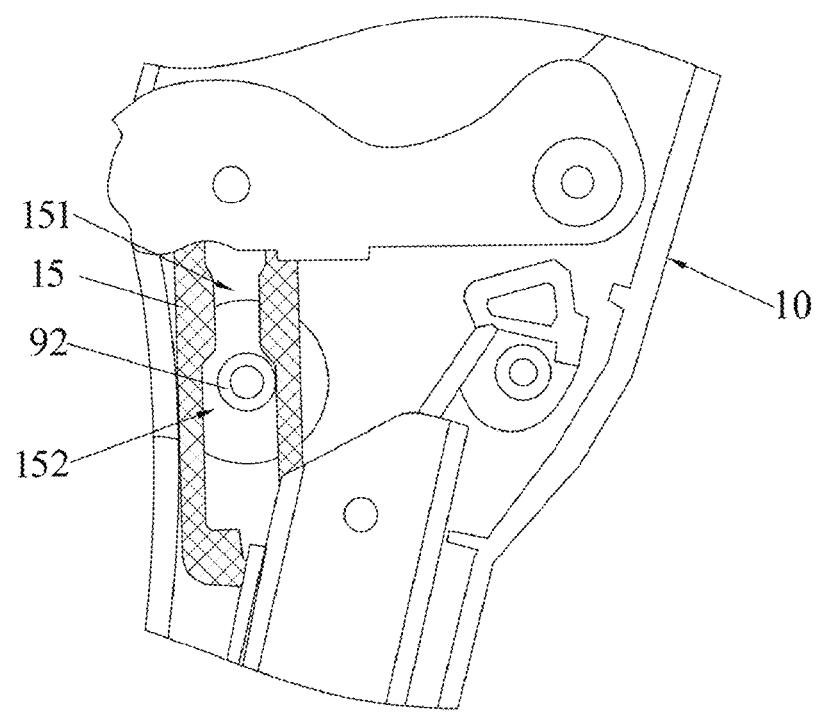
FIG. 30 is a partial internal structural diagram of the stroller as the safety lock is in a releasing state according to the sixth embodiment of the present invention.
Figure 31:
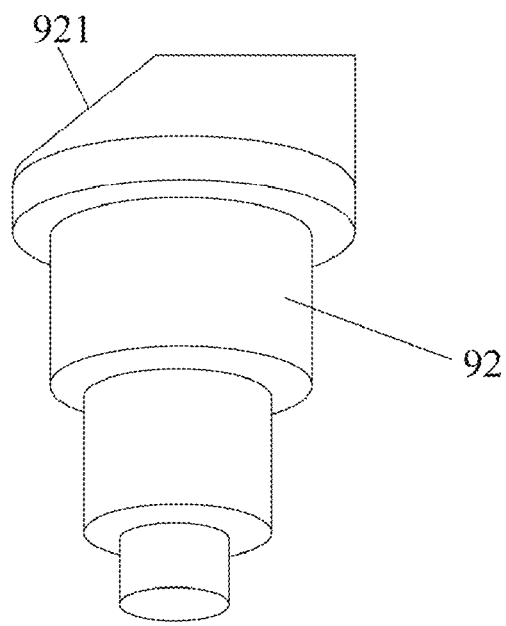
FIG. 31 is a diagram of a locking component according to the sixth embodiment of the present invention.

Please refer to FIG. 27 to FIG. 31. FIG. 27 is a schematic diagram of a stroller 100f according to a sixth embodiment of the present invention. FIG. 28 is a partial diagram of the stroller 100f according to the sixth embodiment of the present invention. FIG. 29 is a partial internal structural diagram of the stroller 100f as a safety lock 90 is in a blocking state according to the sixth embodiment of the present invention. FIG. 30 is a partial internal structural diagram of the stroller 100f as the safety lock 90 is in a releasing state according to the sixth embodiment of the present invention. FIG. 31 is a diagram of a locking component 92 according to the sixth embodiment of the present invention. As shown in FIG. 27 to FIG. 31, different from the first embodiment, the stroller 100f of this embodiment is a four-wheel stroller, and the stroller frame 10 includes the seat plate 13. Furthermore, the safety lock 90 of this embodiment includes a releasing component 91, a locking component 92, a first resilient component 93, a linking component 94, an operating component 95, a second resilient component, which is not shown in the figures, and a third resilient component 96.

The operating component 95 can be a button structure and movably disposed on the seat plate 13 of the stroller frame 10. Preferably, the seat plate 13 is located at the front side of the stroller frame 10 for easy operation. However, it is not limited to this embodiment. The locking component 92 is movably disposed on the stroller frame 10. However, it is not limited to this embodiment. For example, in another embodiment, the locking component can be movably disposed on the frame releasing component. The locking component 92 is slidable relative to the stroller frame 10 between a blocking position as shown in FIG. 29, and a releasing position as shown in FIG. 30. Preferably, in this embodiment, the locking component 92 engages with the stroller frame 10 for restraining the stroller frame from being unfolded when the locking component 92 is located at the blocking position, and the locking component 92 disengages from the stroller frame 10 for allowing the stroller frame 10 to be unfolded when the locking component 92 is located at the releasing position.

Preferably, the locking component 92 can be a step-shaft structure, and the stroller frame 10 can include be a plate structure 15 made of metal material. However, it is not limited to this embodiment. An avoiding slot 151 and a locking slot 152 communicated with the avoiding slot 151 are formed on the plate structure 15. A width of the avoiding slot 151 is less than a width of the locking slot 152. The step-shaft structure includes a first shaft portion and a second shaft portion. A diameter of the first shaft portion is less than the width of the locking slot 152 and the width of the avoiding slot 151. A diameter of the second shaft portion is less than the width of the locking slot 152 and greater than the width of the avoiding slot 151. When the locking component 92 is located the blocking position, the locking component 92 cannot slide into the avoiding slot 33 because the diameter of the second shaft portion of the locking component 92 passing through the locking slot 34 is greater than the width of the avoiding slot 33, which achieves engagement of the stroller frame 10 and the locking component 92 for restraining the stroller frame from being folded. When the locking component 92 is located the releasing position, the locking component 92 can slide into the avoiding slot 33 because the diameter of the first shaft portion of the locking component 92 passing through the locking slot 34 is less than the width of the avoiding slot 33, which allows the stroller frame 10 to be folded.

The first resilient component 93 can preferably be a compression spring and disposed between the locking component 92 and the stroller frame 10. A first end of the first resilient component 93 abuts against the locking component 92, and a second end of the first resilient component 93 abuts against the stroller frame 10, so that the locking component 92 is biased to move to the releasing position by the first resilient component 93. However, it is not limited to this embodiment. For example, in another embodiment, the first resilient component can be a tension spring, and the first end and the second end of the first resilient component can be connected to the locking component and the stroller frame respectively. Alternatively, in another embodiment, the locking component can be biased to move to the blocking position by the first resilient component.

The linking component 94 is disposed between the operating component 95 and the releasing component 91, so that the operating component 95 can drive the releasing component 91 by the linking component 94 to drive the locking component 92 to move from the blocking position to the releasing position. The releasing component 91 is movably disposed on the stroller frame 10. A first end of the linking component 94 is connected to the operating component 95, and a second end of the linking component 94 is connected to the releasing component 91. Specifically, in this embodiment, the locking component 92 can be driven by the first resilient component 93 and the releasing component 91 to move between the blocking position and the releasing position. However, it is not limited to this embodiment.

The third resilient component 96 is disposed between the releasing component 91 and the stroller frame 10, so that the releasing component 91 is biased to recover by the third resilient component 96 to drive the locking component 92 to resiliently deform the first resilient component 93 to move to the blocking position. In other words, in this embodiment, a resilient force generated by the first resilient component 93 is greater than a resilient force generated by the third resilient component 96. Alternatively, in another embodiment, the locking component can be biased to move to the blocking position, the resilient force generated by the second resilient component can be less than or equal to the resilient force generated by the first resilient component.

The second resilient component can preferably be a compression spring and disposed between the operating component 95 and the stroller frame 10. Specifically, since the operating component 95 is disposed on the seat plate 13, the second resilient component is disposed between the operating component 95 and the seat plate 13, and a first end and a second end of the second resilient component abut against the operating component 95 and the seat plate 13 respectively, so that the operating component 95 is biased to recover by the second resilient component. However, it is not limited to this embodiment. For example, in another embodiment, the second resilient component can be a tension spring, and the first end and the second end of the second resilient component are connected to the operating component and the seat plate. Alternatively, in another embodiment, the second resilient component can be omitted, and the operating component can be recovered by the user manually.

Furthermore, in this embodiment, the seat plate 13 is located at the front side of the stroller frame 10, and the locking component 82 is located at the right lateral side of the stroller frame 10. However, it is not limited to this embodiment. For example, in another embodiment, the seat plate can be disposed on the rear side of the stroller frame, and the locking component can be located at the left lateral side of the stroller frame.

As shown in FIG. 29 to FIG. 31, the releasing component 91 is movably disposed on the stroller frame 10, and a moving direction of the releasing component 91 intersects with a moving direction of the locking component 92. In this embodiment, the moving direction of the releasing component 91 is substantially perpendicular to the moving directing of the locking component 92. However, it is not limited to this embodiment.

Furthermore, the releasing component 91 includes a driving profile 951, and the locking component 92 includes an abutting profile 921. The driving profile 951 includes a driving inclined surface formed on an outer periphery of the releasing component 91. The abutting profile 921 includes an abutting inclined surface for cooperating with the driving inclined surface. In other words, the releasing component 91 can drive the locking component 92 to move by cooperation of the driving inclined surface and the abutting inclined surface.

Detailed description of operation of the stroller 100f is provided as follows. When it is desired to fold the stroller 100f, the operating component 95 can be operated to drive the releasing component 91 to move by the linking component 94 to drive the locking component 92 to move from the blocking position as shown in FIG. 29, to the releasing position as shown in FIG. 30. When the locking component 92 moves to the releasing position, the first resilient component 93 is resiliently deformed, and the locking component 92 disengages from the stroller frame 10, so as to allow the stroller frame to be folded when the frame releasing component 30 drives the locking device 20 to unlock the stroller frame 10. In other words, after the operating component 95 to drive the releasing component 91 to drive the locking component 92 move to the releasing positions, the stroller frame 10 is allowed to be folded.

In contrast to the prior art, the safety lock of the present invention utilizes the releasing component to drive the locking component to move between the releasing position and the blocking position. When the locking component is located at the blocking position, the locking component engages with the frame releasing component or the stroller frame to restrain the stroller frame from being folded. When the locking component is located at the releasing position, the locking component disengages from the frame releasing component or the stroller frame to allow the stroller frame to be folded. Therefore, before folding the stroller, it has to operate the releasing component to move the locking component to the releasing component, which can effectively prevent an unintentional folding of the stroller frame caused by unintentional operation of the frame releasing component. Therefore, it improves safety of the stroller. Furthermore, the safety lock of the present invention has advantages of simple structure and easy operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A safety lock adapted for a stroller, the stroller comprising a stroller frame, a locking device and at least one frame releasing component, the stroller frame being switchable between a folded state and an unfolded state, the locking device being for locking the stroller frame to restrain the stroller frame from being folded or for unlocking the stroller frame to allow the stroller frame to be folded, the at least one frame releasing component being for driving the locking device to unlock the stroller frame, the safety lock comprising:

at least one releasing component; and at least one locking component movably disposed on the at least one frame releasing component or the stroller frame, the at least one locking component being driven by the at least one releasing component to move relative to the at least one frame releasing component or the stroller frame between a blocking position and a releasing position, the at least one locking component engaging with the at least one frame releasing component to restrain the at least one frame releasing component from unlocking the stroller frame by the locking device or engaging with the stroller frame to restrain the stroller frame from being folded when the at least one locking component is located at the blocking position, and the at least one locking component disengaging from the at least one frame releasing component to allow the at least one frame releasing component to unlock the stroller frame by the locking device or disengaging from the stroller frame to allow the stroller frame to be folded when the at least one locking component is located at the releasing position.

2. The safety lock of claim 1, further comprising at least one first resilient component disposed between the at least one locking component and one of the stroller frame and the at least one frame releasing component where the at least one locking component is disposed, a first end of the at least one first resilient component being connected to or abutting against the at least one locking component, a second end of the at least one first resilient component being connected to or abutting against the one of the stroller frame and the at least one frame releasing component where the at least one locking component is disposed, and the at least one first resilient component being for biasing the at least one locking component to move to the blocking position.

3. The safety lock of claim 2, wherein the at least one releasing component includes a driving profile, the at least one locking component abuts against the driving profile, and the at least one locking component is driven by the driving profile and the at least one first resilient component to switch between the releasing position and the blocking position when the at least one releasing component moves.

4. The safety lock of claim 3, wherein the driving profile is formed on an outer periphery or an inner periphery of the at least one releasing component.

5. The safety lock of claim 4, wherein the driving profile includes a driving inclined surface or a driving groove.

6. The safety lock of claim 4, wherein the at least one releasing component is pivotally disposed on the stroller frame or the frame releasing component around a first pivoting axis, and a moving direction of the at least one locking component is substantially parallel to the first pivoting axis of the at least one releasing component.

7. The safety lock of claim 6, wherein the at least one frame releasing component is pivotally disposed on the stroller frame, the at least one frame releasing component and the at least one releasing component are arranged along the first pivoting axis of the at least one releasing component, the first pivoting axis of the at least one releasing component is substantially collinear or parallel to a pivoting axis of the at least one frame releasing component.

8. The safety lock of claim 6, wherein the at least one releasing component comprises a stopping protrusion for restraining a range of a pivoting movement of the at least one releasing component around the first pivoting axis.

9. The safety lock of claim 2, further comprising an operating component movably linked to the at least one releasing component for driving the at least one locking component to move to the releasing position by the at least one releasing component.

10. The safety lock of claim 9, wherein the safety lock comprises two releasing components and two locking components, the two releasing components are located at two lateral sides of the stroller frame, the two locking components are located at the two lateral sides of the stroller frame, and two ends of the operating component are connected to the two releasing components located at the two lateral sides of the stroller frame.

11. The safety lock of claim 9, further comprising a second resilient component connected to or abutting against the operating component for biasing the operating component to recover.

12. The safety lock of claim 9, further comprising at least one linking component disposed between the operating component and the at least one releasing component, and the operating component driving the at least one releasing component by the at least one linking component to drive the at least one locking component to move to the releasing position.

13. The safety lock of claim 12, wherein the at least one locking component is substantially a step-shaft structure.

14. The safety lock of claim 1, further comprising at least one linking component disposed between the at least one releasing component and the at least one locking component, and the at least one releasing component driving the at least one locking component to move to the releasing position by the at least one linking component.

15. The safety lock of claim 14, wherein the at least one locking component is pivotally connected to the stroller frame or the at least one frame releasing component, and a pivoting axis of the at least one locking component is substantially collinear or parallel to a pivoting axis of the at least one frame releasing component.

16. The safety lock of claim 15, wherein the at least one locking component comprises a first abutting segment and a second abutting segment divided by the pivoting axis of the at least one locking component, the first abutting segment is for abutting against the stroller frame, and the second abutting segment is for abutting against the at least one frame releasing component.

17. The safety lock of claim 16, wherein an included angle between the first abutting segment and the second abutting segment is less than 90 degrees.

18. The safety lock of claim 14, wherein a moving direction of the at least one locking component is not parallel to a pivoting axis of the at least one frame releasing component.

19. The safety lock of claim 1, further comprising at least one third resilient component disposed between the at least one releasing component and one of the stroller frame and the at least one frame releasing component where the at least one releasing component is disposed, a first end of the at least one third resilient component being connected to or abutting against the at least one releasing component, a second end of the at least one third resilient component being connected to or abutting against the one of the stroller frame and the at least one frame releasing component where the at least one releasing component is disposed, and the at least one third resilient component being for biasing the at least one releasing component to recover.

20. A stroller comprising:
 a stroller frame switchable between a folded state and an unfolded state;
 a locking device for locking the stroller frame to restrain the stroller frame from being folded or for unlocking the stroller frame to allow the stroller frame to be folded;
 at least one frame releasing component for driving the locking device to unlock the stroller frame; and
 a safety lock comprising:
  at least one releasing component; and
  at least one locking component movably disposed on the at least one frame releasing component or the stroller frame, the at least one locking component being driven by the at least one releasing component to move relative to the at least one frame releasing component or the stroller frame between a blocking position and a releasing position, the at least one locking component engaging with the at least one frame releasing component to restrain the at least one frame releasing component from unlocking the stroller frame by the locking device or engaging with the stroller frame to prevent the stroller frame from being folded when the at least one locking component is located at the blocking position, and the at least one locking component disengaging from the at least one frame releasing component to allow the at least one frame releasing component to unlock the stroller frame by the locking device or disengaging from the stroller frame to allow the stroller frame to be folded when the at least one locking component is located at the releasing position.

* * * * *